United States Patent
Isaac

(10) Patent No.: US 11,593,464 B2
(45) Date of Patent: Feb. 28, 2023

(54) SYSTEM AND METHOD FOR PROVIDING USER ACCOUNTS THROUGH WHICH USERS ARE ABLE TO OPERATE COMPUTING DEVICES

(71) Applicant: TipeME Holdings Pty Ltd, Birkdale (AU)

(72) Inventor: Shane Isaac, Birkdale (AU)

(73) Assignee: TipeME Holdings Pty Ltd

( * ) Notice: Subject to any disclaimer, the term of this patent is extended or adjusted under 35 U.S.C. 154(b) by 350 days.

(21) Appl. No.: 16/496,709

(22) PCT Filed: Mar. 26, 2018

(86) PCT No.: PCT/AU2018/050281
§ 371 (c)(1),
(2) Date: Sep. 23, 2019

(87) PCT Pub. No.: WO2018/170560
PCT Pub. Date: Sep. 27, 2018

(65) Prior Publication Data
US 2020/0125701 A1    Apr. 23, 2020

(30) Foreign Application Priority Data
Mar. 24, 2017  (AU) ................................ 2017901071

(51) Int. Cl.
*G06F 21/31* (2013.01)
*G06F 9/451* (2018.01)
(Continued)

(52) U.S. Cl.
CPC ............ *G06F 21/31* (2013.01); *G06F 9/4451* (2013.01); *G06F 9/451* (2018.02); *G06F 21/62* (2013.01)

(58) Field of Classification Search
CPC ........ G06F 21/31; G06F 9/451; G06F 9/4451; G06F 21/62
See application file for complete search history.

(56) References Cited

U.S. PATENT DOCUMENTS 9,203,791 B1    12/2015  Olomskiy
9,251,354 B2    2/2016   Ting et al.
(Continued)

OTHER PUBLICATIONS

International Search Report for corresponding Application No. PCT/AU2018/050281 dated May 17, 2018, pp. 1-6.
VIBER website, https://www.viber.com, pp. 1-3.

*Primary Examiner* — Anil K Bhargava
(74) *Attorney, Agent, or Firm* — The Belles Group, P.C.

(57) ABSTRACT

A smart phone (101) for providing a user account (102) through which a user (103) is able to operate phone (101). The phone (101) includes onboard memory module (104) for storing at least first data records (105). Phone (101) also includes a user interface (106) for receiving input from the user. A processor (107) is responsive to interface (106) receiving a first predetermined input from user (103) for initiating a first authorised session (108) to account (102), and allowing user (103) to access account (102) and discover records (105). Processor (107) is also responsive to interface (106) receiving a second predetermined input from user (103) during session (108) for controlling interface (106) to seek a third input from user (103) to indicate an identifier for a hidden second authorised session (109). Interface (106) does not reveal to user (103) the pre-existence or otherwise of session (109) or any other like session. Processor (107) is also responsive to the third input not corresponding with the identifier for not revealing to user (103) if session (109) or any such other session exists.

12 Claims, 6 Drawing Sheets

(51) Int. Cl.
  *G06F 9/445* (2018.01)
  *G06F 21/62* (2013.01)

(56) References Cited

U.S. PATENT DOCUMENTS

| | | | |
|---|---|---|---|
| 9,286,482 B1* | 3/2016 | Dumont | G06F 21/32 |
| 2013/0031847 A1 | 2/2013 | Donoho | |
| 2014/0283128 A1* | 9/2014 | Shepherd | G06F 21/629 726/28 |
| 2015/0082398 A1* | 3/2015 | Balakrishnan | H04L 63/083 726/5 |
| 2016/0080149 A1 | 3/2016 | Mehta et al. | |
| 2018/0176195 A1* | 6/2018 | Pangam | H04L 63/06 |

\* cited by examiner

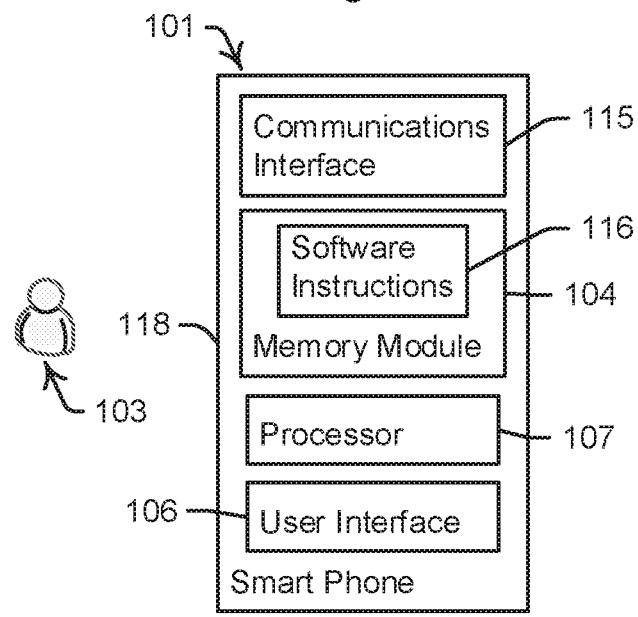
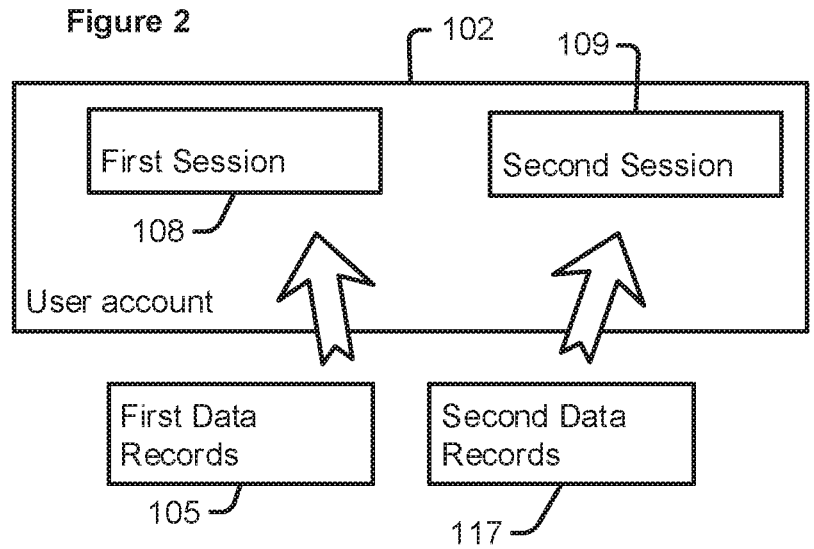

SYSTEM AND METHOD FOR PROVIDING USER ACCOUNTS THROUGH WHICH USERS ARE ABLE TO OPERATE COMPUTING DEVICES

CROSS-REFERENCE TO RELATED PATENT APPLICATIONS

The present application is a U.S. national stage application under 35 U.S.C. § 371 of PCT Application No. PCT/AU2018/050281, filed Mar. 26, 2018, which claims priority to Australian Patent Application No. 2017901071, filed Mar. 24, 2017. The disclosures of the aforementioned priority applications are incorporated herein by reference in their entireties.

FIELD OF THE INVENTION

The present invention relates to a computing device and a method of operating a computing device, and in particular to a system and method for providing user accounts through which users are able to operate computing devices.

Embodiments of the invention have been particularly developed for use with a smart phone and will be described herein with particular reference to that application. However, it will be appreciated that the invention is not limited to such a field of use and is applicable in broader contexts including, without limitation, to other computing devices, whether mobile or fixed, such as tablet devices, desktop devices, laptop computers, automotive computers, client service kiosks, ATMs and the like.

BACKGROUND

Any discussion of the background art throughout the specification should in no way be considered as an admission that such art is widely known or forms part of common general knowledge in the field.

The proliferation of computing devices to enable digital communications between people has given rise to the storage on those devices of contact details such as telephone numbers, email addresses, fax numbers, social media account details, messaging service account details, messaging service ID, a web URL, a postal address or any other type of data that defines or links a person to a location, group, organisation, affiliation, or categorisation. More recently it is also more common to additionally store further data about the people that are interacted with, such as profile photographs, online avatars, birthdays, job titles, positions and many other characterisations.

In addition, application software (or apps) operating locally on computing devices such as smart phones often store other data from the email accounts accessed with the smart phone. For example, by keeping records of interactions with contacts or other individuals in general. Such records can include temporal details of telephone calls, details and content of messages sent via SMS or over a messaging service, details of an email and the content of an email or any type of digital message being sent, received or communicated from one person to another via the relevant account. The storage of this information is not necessarily limited to those interactions with parties that are stored as contacts on the smart phone, but often for all parties with whom there is digital interaction. It is not unusual for such records to be also stored on the server side by the provider of the app, or backed-up to one or more databases of a telecommunications provider or smartphone provider. While this allows for significant utility to the user—for example, by allowing the user to access the data with multiple devices—it also increases the risk of a data breach, increases the complexity of operation, and requires greater network bandwidth to provide the desired functionality.

Given the nature of the information now held on such devices and any associated remote servers there is an increasing need for maintaining the data securely, particularly as a safeguard in the event of loss or theft of the computing device or a security breach of the backed-up data. Often the only security measure taken is to require a four digit code or the like to be entered to gain access to the device and the data held on that device. In those circumstances where additional security is required, use is made of further apps resident on the device which require a user to enter user credentials and respective passwords before access is able to be gained to the relevant data. It is also possible to have sensitive documents individually password protected. While these solutions provide some advantages, they are open to being targeted by less scrupulous individuals.

In an attempt to partially address these shortcomings there is available an app referred to as Viber™ (www.viber.com) with an instant messaging functionality that allows "secret chats". While this app provides limited protection for instant messages sent within that app, it is very narrow in its application to small amounts of text data and does not provide an effective solution for any other form of data.

Accordingly, there is a need in the art for an improved system and method for providing user accounts through which users are able to operate computing devices.

SUMMARY OF THE INVENTION

It is an object of the present invention to overcome or ameliorate at least one of the disadvantages of the prior art, or to provide a useful alternative.

According to a first aspect of the invention there is provided a computing device for providing a user account through which a user is able to operate the device, wherein the device includes:
  memory for storing at least first data records;
  a user interface for receiving input from the user and
  a processor that is responsive to:
  a) the interface receiving a first predetermined input from the user for: initiating a first authorised session of the user account; and allowing the user to access the user account and discover the first data records;
  b) the interface receiving a second predetermined input from the user during the first authorised session for controlling the interface to seek a third input from the user to indicate an identifier for a hidden second authorised session, wherein the pre-existence of the second authorised session is not revealed to the user; and
  c) the third input not corresponding with the identifier for not revealing to the user if the second authorised session exists.

In an embodiment, the processor is responsive to user activity during the second authorised session for creating or updating one or more second data records, wherein the second data records stored in the memory are only discoverable during the second authorised session.

In an embodiment, the processor is responsive to a fourth predetermined input from the user for terminating the second authorised session.

In an embodiment, the processor is responsive to the termination of the second authorised session to return the device to the first authorised session.

In an embodiment, the processor is responsive to a subsequent third input from the user corresponding with the one of the identifiers for initiating the second authorised session.

According to a second aspect of the invention there is provided a computing device for providing a user account through which a user is able to operate the device, wherein the device includes:
 memory for storing first data records and second data records, wherein the second data records are hidden;
 a user interface for receiving input from the user; and
 a processor that is responsive to:
  a) the interface receiving a first predetermined input from the user for initiating a first authorised session of the user account; and allowing the user to access the user account and discover the first data records while maintaining the second data records hidden;
  b) the interface receiving a second predetermined input from the user during the first authorised session for controlling the interface to seek a third input from the user to indicate a respective identifier for one of one or more hidden second authorised sessions, wherein the pre-existence of the one or more second authorised sessions is not revealed to the user; and
  c) the third input corresponding and not corresponding with one of the identifiers for respectively: initiating the respective second authorised session in which the user is able to discover at least a subset of the second data records; and not revealing to the user if any of the one or more second authorised sessions exist.

In an embodiment, the processor allows the user, during the first authorised session, to discover and access the first data records.

In an embodiment, the processor allows the user, during the second authorised session, to discover and access the subset of the second data records.

In an embodiment, the processor prevents the user, during the second authorised session, from discovering the first records.

In an embodiment, the processor is responsive to the third input corresponding with one of the identifiers for not revealing to the user if another of the one or more second authorised sessions exist.

In an embodiment, the subset includes a null set.

In an embodiment, for each identifier the respective subsets are mutually exclusive.

In an embodiment, the memory stores application software and the processor is responsive to the initiation of one of the second authorised sessions and the execution of the application software for updating at least one of the subset of second data files with data produced by the application software.

In an embodiment, the processor is responsive to the initiation of the second authorised session and the execution of the application software for offering the user the choice of selectively updating the subset of second data files with data produced by the application software.

In an embodiment, the processor is responsive to the initiation of the second authorised session and the execution of the application software for updating one or more of the subset of second data files with all the data produced by the application software that is to be stored in the memory.

In an embodiment, the first data records and the second data records include data indicative of one or more of: an email message; and SMS message; social networking messages, images or other data; a photograph or other image file; text; alphanumeric characters; contact data; digital indicia; and a combination of any one or more of the preceding data.

In an embodiment, the computing device includes a communications interface for allowing the device to receive communications data from a remote computing device, wherein the processor is responsive to the interface receiving a fourth predetermined input from the user for storing at least some of the communications data as second data records.

In an embodiment, the processor, in absence of the fourth predetermined input, stores the communications data as first data records.

According to a third aspect of the invention there is provided a method for providing a user account through which a user is able to operate a computing device, wherein the method includes the steps of:
 providing memory for storing at least first data records;
 receiving input from the user with a user interface; and
 providing a processor that is responsive to:
  a) the interface receiving a first predetermined input from the user for: initiating a first authorised session of the user account; and allowing the user to access the user account and discover the first data records;
  b) the interface receiving a second predetermined input from the user during the first authorised session for controlling the interface to seek a third input from the user to indicate an identifier for a hidden second authorised session, wherein the pre-existence of the second authorised session is not revealed to the user; and
  c) the third input not corresponding with the identifier for not revealing to the user if the second authorised session exists.

In an embodiment, the processor is responsive to user activity during the second authorised session for creating or updating one or more second data records, wherein the second data records stored in the memory and are only discoverable during the second authorised session.

In an embodiment, the processor is responsive to a fourth predetermined input from the user for terminating the second authorised session.

In an embodiment, the processor is responsive to the termination of the second authorised session to return the device to the primary authorised session.

In an embodiment, the processor is responsive to a subsequent third input from the user corresponding with the one of the identifiers for initiating the second authorised session.

According to a fourth aspect of the invention there is provided a method of operating a computing device for providing a user account through which a user is able to operate the device, wherein the method includes the steps of:
 storing in memory at least first data records;
 receiving input from the user via a user interface; and
 providing a processor that is responsive to:
  a) the interface receiving a first predetermined input from the user for initiating a first authorised session of the user account; and allowing the user to access the user account and discover the first data records;
  b) the interface receiving a second predetermined input from the user during the first authorised session for controlling the interface to seek a third input from the user to indicate an identifier for a hidden second authorised session, wherein the pre-existence of the second authorised session is not revealed to the user; and c) the third input not corresponding with the identifier for not revealing to the user if the second authorised session exists.

According to a fifth aspect of the invention there is provided a method for providing a user account through which a user is able to operate a computing device, wherein the method includes the steps of:

providing memory for storing first data records and second data records, wherein the second data records are hidden;

receiving input from the user with a user interface of the computing device; and providing a processor that is responsive to:
a) the interface receiving a first predetermined input from the user for initiating a first authorised session of the user account; and allowing the user to access the user account and discover the first data records while maintaining the second data records hidden;
b) the interface receiving a second predetermined input from the user during the first authorised session for controlling the interface to seek a third input from the user to indicate a respective identifier for one of one or more hidden second authorised sessions, wherein the pre-existence of the one or more second authorised sessions is not revealed to the user; and
c) the third input corresponding and not corresponding with one of the identifiers for respectively: initiating the respective second authorised session in which the user is able to discover at least a subset of the second data records; and not revealing to the user if any of the one or more second authorised sessions exist.

According to a sixth aspect of the invention there is provided a computing device for providing a user account through which a user is able to operate the device, wherein the device includes:

memory for storing at least first data records;
a user interface for receiving input from the user; and
a processor that is responsive to:
a) the interface receiving a first predetermined input from the user for: initiating a first authorised session of the user account; and allowing the user to access the user account and discover the first data records; and
b) the interface receiving a second predetermined input from the user during the first authorised session for controlling the interface to seek a third input from the user to indicate an identifier for a hidden second authorised session, wherein the existence of the second authorised session is not revealed to the user unless the third input corresponds with the identifier for the hidden second authorised session.

According to a seventh aspect of the invention there is provided a method for providing a user account through which a user is able to operate a computing device, wherein the method includes the steps of:

providing memory for storing at least first data records;
receiving input from the user with a user interface of the computing device; and providing a processor that is responsive to:
a) the interface receiving a first predetermined input from the user for initiating a first authorised session of the user account; and allowing the user to access the user account and discover the first data records; and
b) the interface receiving a second predetermined input from the user during the first authorised session for controlling the interface to seek a third input from the user to indicate an identifier for a hidden second authorised session, wherein the existence of the second authorised session is not revealed to the user unless the third input corresponds with the identifier for the hidden second authorised session.

According to an eighth aspect of the invention there is provided a computing device for providing a user account through which a user is able to operate the device, wherein the device includes:

memory for storing first data records and second data records, wherein the second data records are hidden;
a user interface for receiving input from the user; and
a processor that is responsive to:
a) the interface receiving a first predetermined input from the user for initiating a first authorised session to the user account; and allowing the user to access the user account and discover the first data records while maintaining the second data records hidden; and
b) the interface receiving a second predetermined input from the user during the first authorised session for controlling the interface to seek a third input from the user to indicate a respective identifier for one of one or more hidden second authorised sessions, wherein the existence of a given second authorised sessions is not revealed to the user unless the third input corresponds to the identifier for that given session.

In an embodiment, each second data record includes at least one security field.

According to a ninth aspect of the invention there is provided a method for providing a user account through which a user is able to operate a computing device, wherein the method includes the steps of:

storing first data records and second data records in memory, wherein the second data records are hidden;
receiving input from the user with a user interface; and
providing a processor that is responsive to:
a) the interface receiving a first predetermined input from the user for initiating a first authorised session to the user account; and allowing the user to access the user account and discover the first data records while maintaining the second data records hidden; and
b) the interface receiving a second predetermined input from the user during the first authorised session for controlling the interface to seek a third input from the user to indicate a respective identifier for one of one or more hidden second authorised sessions, wherein the existence of a given second authorised sessions is not revealed to the user unless the third input corresponds to the identifier for that given session.

According to a tenth aspect of the invention there is provided a system for providing user accounts through which users are able to operate computing devices, wherein the system includes:

memory for storing for each user first data records and second data records, wherein the second data records are hidden;
a user interface for receiving input from the users; and
a system processor that is responsive to:
a) the interface receiving a first predetermined input from a given user for: initiating a first authorised session of the user account of that user and allowing that user to access the user account and discover the first data records for that user while maintaining the second data records hidden; and
b) the interface receiving a second predetermined input from the given user during the first authorised session for controlling the interface to seek a third input from that user to indicate a respective identifier for one of one or more hidden second authorised sessions for that user, wherein the existence of a given second authorised session is not revealed to that user unless the third input corresponds to the identifier for that given session.

In an embodiment the memory includes a first memory module on each of the devices for selectively storing the first and second data records for the respective users and a second memory module remote from the devices for selectively storing the first and second data records for the users.

In an embodiment the computing devices include respective device interfaces for collectively defining, at least in part, the user interface.

In an embodiment the computing devices include respective device processors for collectively defining, at least in part, the system processor.

According to an eleventh aspect of the invention there is provided a method for providing user accounts through which users are able to operate computing devices, wherein the method includes the steps of:

storing in memory for each user first data records and second data records, wherein the second data records are hidden;

receiving input from the users with a user interface; and providing a system processor that is responsive to:

a) the interface receiving a first predetermined input from a given user for initiating a first authorised session of the user account of that user; and allowing that user to access the user account and discover the first data records for that user while maintaining the second data records hidden; and b) the interface receiving a second predetermined input from the given user during the first authorised session for controlling the interface to seek a third input from that user to indicate a respective identifier for one of one or more hidden second authorised sessions for that user, wherein the existence of a given second authorised session is not revealed to that user unless the third input corresponds to the identifier for that given session.

According to a twelfth aspect of the invention there is provided a data structure for a plurality of hidden data records collectively derived from a plurality of types of data files and stored in memory, where each data record is associated with a hidden session and includes:

encrypted content data derived from the respective data file;

a record identification field for containing a first identifier for the data record;

a session identification field for containing an identifier for the respective hidden session; and a type field for containing an identifier for the type of the respective data file.

In an embodiment the encrypted content data for each data file includes a main file and a secondary file.

In an embodiment the main file is indicative of the content of the respective data file and the secondary file is a thumbnail file for the respective data file.

In an embodiment each data record includes an initial session identification field for containing an identifier for the respective hidden session to which the record was initially associated with.

In an embodiment each data file is associated with one of a plurality of users each having a computing device and the memory includes: a first memory module on each of the computing devices for selectively storing the hidden data records associated with that user; and a second memory module of a computer system that is remote from the devices for selectively storing the data records.

In an embodiment each data record includes a system identification field for containing a second identifier for the data record.

In an embodiment the first identifier is allocated by the respective computing device and the second identifier is allocated by the computing system.

In an embodiment each data record includes a storage identification field for indicating if the respective record file is stored in the second memory.

In an embodiment there are a plurality of hidden sessions and each data record is associated with one such session.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, importance, or in any other manner.

Unless the context clearly requires otherwise, in the claims below and the description herein, any one of the terms "comprising", "comprised of" or "which comprises" is an open term that means "including at least the elements/features that follow, but not excluding others". Thus, the term "comprising", when used in the claims, should not be interpreted as being limitative to the means or elements or steps listed thereafter. For example, the scope of the expression "a device comprising A and B" should not be limited to devices consisting only of elements A and B. Any one of the terms "including" or "which includes" or "that includes" as used herein is also an open term that also means "including at least the elements/features that follow the term, but not excluding others". Thus, the term "including" is synonymous with and means "comprising", and can be used interchangeably.

As used herein, the term "exemplary" is in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which:

FIG. 1 illustrates schematically a computing device in the form of a smart phone, according to an embodiment of the invention;

FIG. 2 is a schematic representation of the authorised sessions and the data records;

DETAILED DESCRIPTION

Described herein are a computing device and a method for providing a user account through which a user is able to operate the device.

Figure 3:
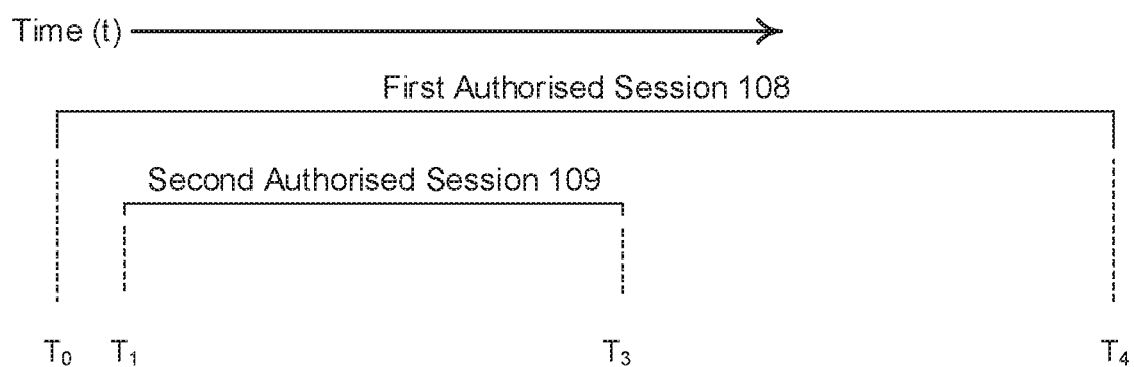
FIG. 3 is a schematic representation of the temporal relativity of the authorised sessions.

Referring to FIG. 1 there is illustrated schematically a computing device in the form of a smart phone 101 for providing a user account 102 (as schematically illustrated in FIG. 2) through which a user 103 is able to operate phone 101. The smart phone includes memory, in the form of onboard memory module 104, for storing at least first data records 105. Phone 101 also includes a user interface 106 for receiving input from the user typically, but not necessarily exclusively, in the form of manual input. A processor 107 is responsive to interface 106 receiving a first predetermined input from user 103 for initiating a first authorised session 108 to account 102 (as schematically illustrated in FIG. 3), and allowing user 103 to access account 102 and discover the first data records 105. Processor 107 is also responsive to interface 106 receiving a second predetermined input from user 103 during session 108 for controlling interface 106 to seek a third input from user 103 to indicate an identifier for a hidden second authorised session 109. In doing so, interface 106 does not reveal to user 103 the pre-existence or otherwise of session 109 or any other like session. Processor 107 is also responsive to the third input not corresponding with the identifier for not revealing to user 103 if session 109 or any such other session exists.

Phone 101 also includes a communications interface 115 for allowing electronic communication between phone 101 and other electronic devices, typically via one or more intermediate communications networks (not shown).

Module 104 stores, amongst other things, software instructions 116 that are accessed and executed by processor 107 to provide the functions and controls offered by phone 101. In this embodiment, the software instructions include application software (described below) for contributing to the specific functionality of phone 101 in accordance with the invention. Module 104 also stores second data records 117 that are, by default in this embodiment, hidden data records.

Phone 101 also includes a housing 118 in or on which the other components of phone 101 are contained and/or mounted. It will be appreciated by those skilled in the art that other components are also included in phone 101 to allow its operating but which are not explicitly illustrated to retain clarity in the drawings.

Processor 107 is responsive to interface 106 receiving the first predetermined input from the user, in the form of a correct access password for phone 101, for initiating, as shown in FIG. 3, session 108 for account 102 at time $T_0$. During session 108, which extends from $T_0$ to $T_4$, processor 107 allows user 103 to access account 102 and first data records 105, while simultaneously preventing user 103 from discovering and accessing second records 117. Processor 107 is also responsive to interface 106 receiving the second predetermined input from user 103, in the form of user 103 activating or prompting the application software, during session 108 (that is, for $T_0<t<T_4$) for controlling interface 106 to seek a third input from user 103. The third input in this embodiment takes the form of a four digit code that needs to correspond with an identifier for session 109. In seeking the four digit code (that is, the third input) interface 106 does not reveal to user 103 the existence or otherwise of session 109 on phone 101. That is, the availability of the second session is not apparent to user 103 merely through use of the phone 101. If the four digit code provided by user 103 as the third input corresponds with the identifier, processor 107 initiates session 109 at $T_1$ and allows user 103 to discover data records 117 until session 109 is terminated. That is, the access to data records 117 is allowed from $T_1<t<T_3$.

First data records 105 and the second data records 117 have respective access states that are selected from a hidden state and an unhidden state. During session 108, the access state of records 105 is the unhidden state, except during session 109, when the access state of records 105 is the hidden state. That is, once user 103 initiates session 109 and is able to discover and access records 117, user 103 no longer has access to records 105. However, in other embodiments, user 103 retains access to records 105 during session 109. This is expressed below for two example embodiments.

Example embodiment A, as illustrated in FIG. 2:

| | Access State | |
|---|---|---|
| Records | First Session 8 | Second Session 9 |
| Records 105 | unhidden | hidden |
| Records 117 | hidden | unhidden |

Figure 6:
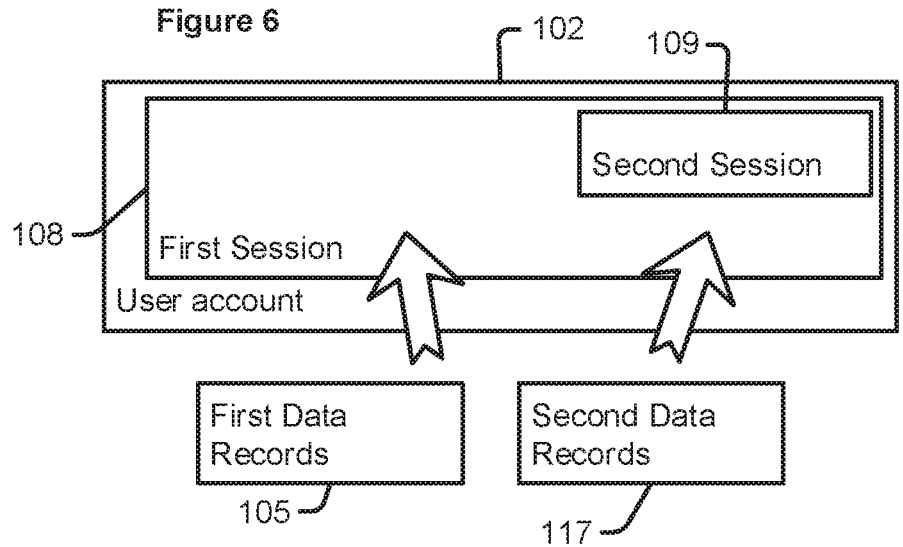
FIG. 6 is a schematic representation of a variation on the structure of FIG. 2.

Example embodiment B, as illustrated in FIG. 6:

| | Access State | |
|---|---|---|
| Records | First Session 8 | Second Session 9 |
| Records 105 | unhidden | unhidden |
| Records 117 | hidden | unhidden |

In this embodiment the first predetermined input is to unlock phone 101 by entering a predetermined four digit code. That is, if the correct predetermined code is entered, user 103 is able to access the user account 102 and records 105, in a password secured environment provided normally by phone 101. In less preferred embodiments the first predetermined input is simply to progress phone 101 from a standby state or an OFF state to an ON state. In other embodiments, a secure environment for access to account 102 is provided by a password or pass-code of other than four digits. Further embodiments make use of first predetermined inputs that rely upon non-alphanumeric codes such as gestures, audible information or other biometric information from the user that is deemed to sufficiently match biometric records securely stored in module 104.

The preferred embodiments of the invention allow a user of a computing device to keep various data records (regardless of the type of record) private from another person using that device, or even from other software executed by the computing device. Some embodiments use software (in the form of a software application operating on the computing device) to implement an internal access code system within the user account provided by the computing device. This access code system is able to be applied selectively (either manually and/or automatically) by the user to incoming and outgoing communication data. That data is tagged in data records that are either first data records or second data records. The first data records are normally accessible via the user account, whereas discovery and access to the second data records is locked (that is, hidden) and unlocked (that is, unhidden) by the relevant access code without the user having to provide other accompanying credentials. The access codes are able to be configured as four digit codes inside or outside of a password secured environment—that is, the user account need not be subject to a password, biometric input, or other security measures—although the preference is for implementation inside a password secured environment. Access codes (that is, passwords or the like) are able to be a private password-like codes comprised of digits, but in other embodiments consist of a string of alphanumeric characters and/or various images, gestures, signs or additional types of verification methods. In some embodiments a multiple digit code is used alone, while in other embodiments a multiple digit code is used in combination with a unique open non-password like ID which requires an access code linked to that ID for a successful response of hidden data to be returned. In the preferred embodiments there is no list stored on the computing device of hidden data that is available to be displayed unless and until an existing access code has been successfully entered to unlock (that is, unhide) the relevant hidden data. That is, the access code, or an indication of its existence, is not visibly presented to the user until a correct access code has been entered as third input.

While the above embodiments have been described with reference to a smart phone, such as phone 101, it will be appreciated that it is also applicable to other computing devices such as desktop computer, laptop computers, wearable devices, tablet computers, other handheld devices, and other standalone or networkable computing devices such as ATMs, information kiosks, or the like. These computing devices will typically each have an operating system such as that referred to as iOS, Android, Windows, Windows desktop, Mac OSX and the like. The embodiments of the invention typically make use of a suitable configured app which is able to run on at least one of such operating systems.

The first and second data records are able to be selected from a wide range of available data records. The above embodiments accommodate the first and second data records each being one or more of: an email message; and SMS message; social networking messages, images or other data; a photograph or other image file; text; a contact record; browsing history; call history; other data retained by application software running on the device; a scanned document or image; alphanumeric characters; contact data; digital indicia; portable document format files; text files; video files; word processing files; spreadsheets; presentations; and a combination of any one or more of the preceding data records.

For numerous reasons, a user of a computing device may wish to keep one or more data records (or any other type of data) private from another user of that computing device, or from other application software running on that device. This functionality is enabled by the embodiments of the invention by making use of an internal system of hidden identifiers that are able to be applied to one or a range of similar or disparate data types and used to lock and unlock access to that data without the need of other accompanying credentials being entered by the user every time that access is desired. The identifiers operate as pin codes inside or outside of a logged in environment. However inside a logged in environment is preferred. The identifiers area able to be a private password-like codes including a predefined sequence of digits, although in other embodiments use is made of alphabetic letters and/or various images and/or signs and/or additional types of verification methods such as mentioned elsewhere in this patent specification.

The user is able to apply an identifier any one or more contacts, contact details, messages, emails or any such transmittable data. A number of examples of this data is provided through this patent specification and includes many file types such as text files, video files, image files, HTML files, rich text files, PDF format files and the like. The application software of the embodiment allows the user to save any data files as records 105 and 117, after applying an identifier correctly to that data, to effectively hide the details of that contact or other data. That is, the data will be saved as one or more second data records and will thereafter only be discoverable and accessible by the user once the associated second authorised session has been initiated.

The second data records are completely hidden from any view inside the software application until the user unlocks those second data records with the relevant and correct identifier that initiates the second session. It will be appreciated that the user is able to group data, whether or the same of disparate types, under the same second authorised session automatically if the same identifier is applied to the different data. For example, if the user stores some data as second data records using the identifier 1234 and later wishes to add more data to be accessed only during that second authorised session, then the user is able to select the relevant data, enter the identifier 1234, and additional second records will be created (or the existing second records updated) such that the relevant data becomes effectively hidden during the first authorised session, and yet discoverable during the second authorised session having the identifier 1234.

The user of the software application is also able to select other various settings for each second authorised session to apply to the second data records associated with that session. For example, to select whether: a notification is displayed or not displayed when a contact or group of contacts is in the hidden state (has not had a pin activated to display that contact); to hide the call history with that contact; and to only hide the contact details of that contact and/or hide the message history with that contact. The latter would include messaging between the software application, SMS messaging, and any other type of communication method such a voice calls, video sharing, photo sharing and so forth with that contact.

When second data records become discoverable, and a hidden contact or other second data is unlocked, it is typically displayed in its own section which would allow the person who unlocked the details to see precisely which details have been unlocked and are open at any given time. However, in other embodiments, the unhidden second data is displayed amongst the first data, which includes the unhidden current contact details, or call history details, or message details. When second data records, such as a contact or other data, is unlocked, the user who unlocked the details is able to decide whether the second data is to be automatically hidden again, or if it is to be selected for retention as second data records. Other options include:

automatically hiding the relevant second data records when the software application is closed or minimised: automatically hiding the relevant second data records after a certain period of time; hiding the temporarily discoverable second data records using an interrupt or kill switch; hiding the temporarily discoverable second data records using another type of physical or verbal command; hiding the temporarily discoverable second data records manually based upon user selection. The last option preferentially includes a kill switch-type button which, when activated, automatically hides any currently discoverable second data records.

Figure 4:
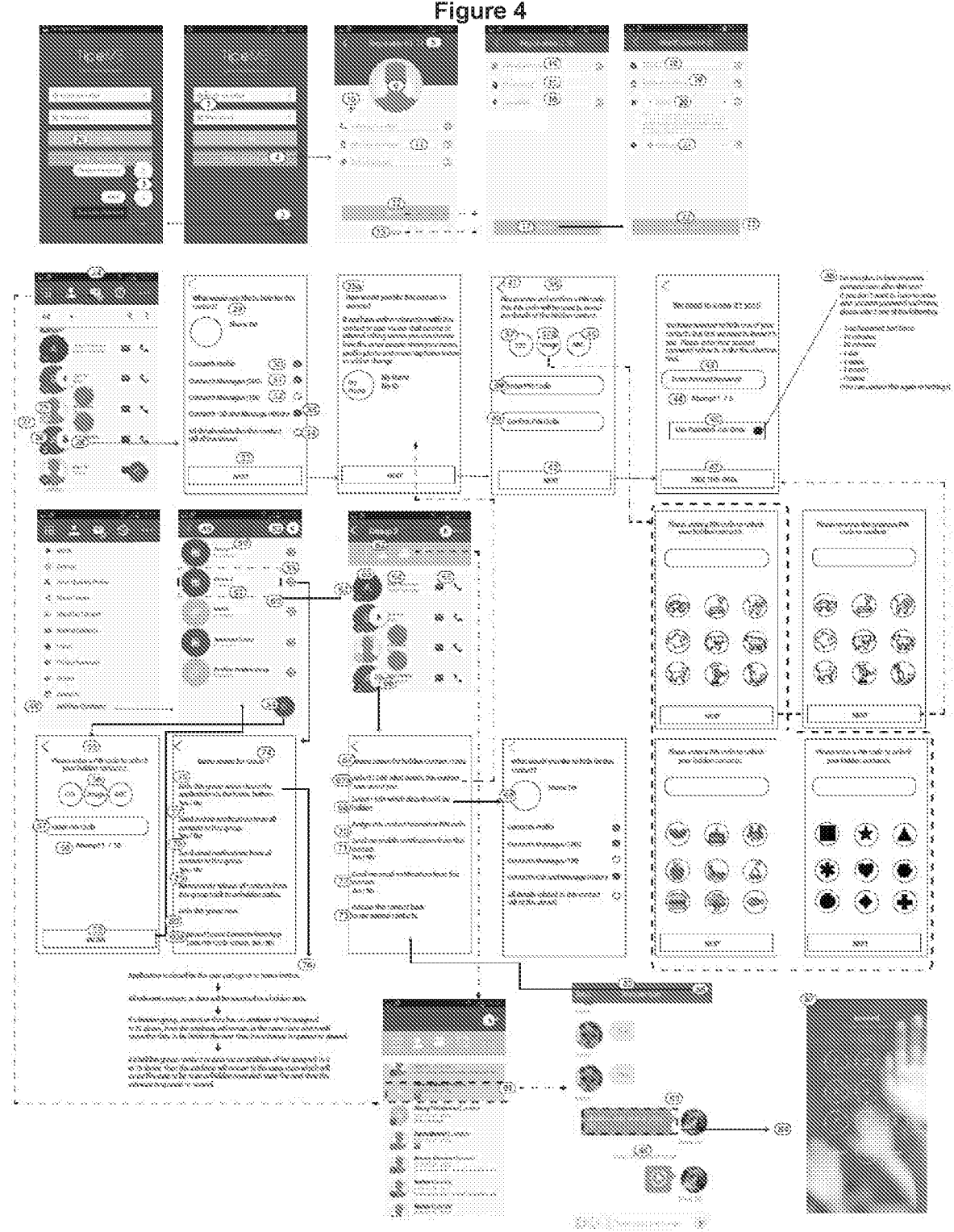
FIG. 4 is a sequence of screenshots illustrating the method of an embodiment of the invention.

One scenario for the software application is as follows. User A creates a user account on the computing device that runs the application software, and imports their phone device contacts into the software. Through use of the application software, User A finds other users to communicate with, and adds contact details for those users to the contacts list in User A's computing device. User A selects three of the contacts from those imported contacts, which are referred to as "Bill", "Bob" and "Bryan". User A also selects two of his or her software application user contacts which are referred to as "TMID1" and "TMID2". User A proceeds to then apply the same identifier to all the five contacts, which in this example, is identifier 4567. User A selects that all data generated in respect of communications with contacts TMID1 and TMID2 will automatically be saved as second data against identifier 4567. Accordingly, all emails, messages, and other such application generated data, will remain hidden once the second session associated with identifier 4567 is terminated. All data in this example would include the SMS history, message/chat history, call history, and the like. Where any one or more of the second data records are generated for use only by a specific software application, that specific software application will only be able to discover that or those second data records during the second authorised session associated with identifier 4567. That is, the relevant second records will not be discoverable until the identifier 4567 is entered to unlock/unhide the second data records. The identifier is sought from the user as the third input, which is typically done by interface 106 presenting user 103 with a screen image 55 as illustrated in FIG. 4. User A selects for the contacts stored as second records against identifier 4567 to become hidden again when the software application is closed or minimised.

User A then selects two other device contacts, say "Sue" and "Shannon", and one other software application user, say "TMID3", then allocates that data to the second authorised session by apply identifier 1234 to all of them. That is, the second records are updated to include that data to remain hidden unless and until the second authorised session associated with identifier 1234 is initiated. User A selects for the SMS and chat conversation with Sue to be hidden, but for the call history and contact details of Sue to remain open. User A selects for the call history and SMS and chat conversation to be hidden for Shannon, but the contact details to remain open. User A selects for contact details, SMS and conversation chat and call history to be hidden for TMID3. User A selects for all contacts associated with identifier 1234 to remain open—that is, to remain part of the first data records—and will only be hidden if User A initiates hiding those contacts manually.

The application software is opened in a state with all hidden contacts—that is, those contacts stored as second data records—remaining hidden. User A provides the third input to interface 106, by keying in the identifier 4567, and the second authorised session associated with that identifier is initiated. Accordingly, the contact details for Bill, Bob, Bryan, TMID1 and TMID2 appear and become discoverable and accessible, while all other contacts (and other first data records) become hidden. Once that second authorised session is terminated, User A returns to the first authorised session and keys in identifier 1234, resulting the associated second authorised session being initiated. Accordingly, Sue's SMS and chat conversation, Shannon's call history and SMS and chat conversation and TMID3's contact details, SMS and chat conversation and call history and all opened and revealed.

It should be noted that User A could not, at any time, see or detect any indication that identifiers 1234 and 4567 existed, or that the associated second authorised sessions pre-existed. User A only knows that those two second authorised sessions pre-exist—that is, are available to be initiated—because User A assigned and re-entered the identifier for those sessions.

User A then closes the software application and the second data records held for Bill, Bob, Bryan, TMID1 and TMID2 are all automatically hidden again and the second authorised session associated with identifier 4567 is terminated.

In some embodiments, the second data for Sue, Shannon and TMID3 remains open until User A manually hides it again using a method such as the kill switch or specifically hiding the details of the second records associated with the identifier 1234.

The assigned identifiers are able to be changed and updated for specific groups or sets of second data records. For example, contacts are able be swapped to another second authorised session associated with a different identifier, or may be part of multiple second authorised sessions. Such actions of transferring or sharing data between different second authorised session is only achieved when the relevant second data is discoverable in an already associated second authorised session. For otherwise, User A, or any user of the computing device, is provided with no evidence that the second data exists within the app or the computing device.

Another scenario is for a User B to open a software application in the first authorised session and to send a message to another user, which may be responded to, and so on, to form a conversation. User B then decides to have the resultant conversation saved as one or more second data record. Once the relevant identifier is applied to the conversation, the conversation disappears from view during the current first session and will only be discoverable again and accessible when the user enters the relevant identifier to initiate the associated second authorised session.

It will be appreciated by those skilled in the art, given the benefit of the teaching herein, that may other combinations and permutations of allocations of data to the first data records and the second data records are possible, and that embodiments of the invention offer great flexibility to the user to protect selectively maintain the secrecy and confidentiality of the data that is saved in the second data records.

A method according to an embodiment of the invention will now be further elaborated with reference to FIG. 4. In particular, a person (referred to as user 103) is able to access phone 101 by providing the first predetermined input. In this embodiment, phone 101 has been preloaded with contact application software referred to as TipeME. This application runs locally on phone 101 to allow user 103 to interact with a server (not shown) running complementary software to collectively enable to contact functionality being offered. The server includes, amongst other things, a server database (SDB) for storing operational data and other data to facilitate the operation of the functionality provided by those overall system. The user is able to initiate the application software by manually tapping the icon as presented by interface 106, such that the login screen, as illustrated in FIG. 4, is displaced by the interface. User 103 then logs into the application software (and hence the server-side software) by entering his or her registered email address plus a relevant predefined password in the text fields lying respectively above and below the reference numeral 1 in FIG. 4. User 103, via interface 106, then taps the presented LOG IN button 26. If the entered email or password is incorrect, there is an error pop up is provided on interface 106 to notify user 103. The email and password are referenced from the SDB.

The virtual button 2 illustrated in FIG. 4 is selected by user 103 to expand a list of options. In this embodiment, two options appear after pressing button 2. These are illustrated in FIG. 4 and lie respectively above and below the reference numeral 3. In particular, these options are entitled "Password Recovery" and "About". Selecting the Password Recovery button will load a webpage which allows user 103 to begin the procedure of recovering a forgotten password. Selecting the About button will load a webpage which has further details about the application software and what the application software does.

If user 103 is not already registered for use with the application software, he or she is able to select a Registration button 4 to begin a registration process. This registration process includes a first registration screen 5 (which is presented by interface 106 to user 103) and which allows user 103 to insert a profile photo and add various contact points which will later be associated to a successfully registered account. This particular screen 5 is able to be shifted back in the registration process if necessary.

User 103 is able to select icon 6 manually (or with a cursor or other pointing device) to load a profile photo interface and to add a profile photo. After the icon is selected, user 103 is prompted to 'Choose a photo from their gallery' or 'Take a photo'. If user 103 selects the first option, then the users gallery is displayed and the user is able to select an existing photo held in phone 101. If the user selects the second option, then the device camera is initiated and loaded, and the next digital image captured by the camera is offered up to be loaded to the next step. In the next step, the user is able to crop and rotate the photo according to his or her preference. After any desired crop and rotate are affected, the user is able to add a filter effect to the image. Once the filter effect, if any, is applied to the image, user 103 will be able to preview the result before confirming an advance to the next step. The user is also able to press icon 6 to visualise what their profile photo will look like with a circular crop.

User 103 is able to select icon 10 to add more types of contact points to the list.

By default, in this embodiment, user 103 is able to enter a phone number, mobile number and/or an email address in those respective fields adjacent to the reference numeral 11 in FIG. 4.

Once user 103 is satisfied with the results of the data entered, he or she is able to select button 12 to move to the next step of the registration process. Alternatively, user 103 is able to select the 'Skip' button 13, in which case any and all entered data on the screen is ignored and the next step of the registration process is loaded. At this next step, user 103 enters a valid email address. This email address must be unique and correspond with a login email address stored on the SDB. Additionally, user 103 must enter a valid password in field 15, where the password must have at least six characters. In other embodiments further requirements are placed upon passwords.

In field 16, user 103 must enter a valid location by entering the closest town or city to where he or she is located. While the user enters their location, the entered characters are referenced back to the SDB, which contains an extensive list of most major towns and cities around the world. Accordingly, an auto response list is fed back after the first three characters are entered, and the list continues to be minimised as user 103 enters more characters. User 103 must select a location from the suggested list before being able to proceed. Accordingly, at this step, user 103 must have entered a valid and unique email address and password, and must have selected a location. If an attempt is made to progress without those prerequisites being fulfilled, an error response will be displayed on interface 106.

In this embodiment, prefix is added to the user ID for the application software based on the user's selected location. This prefix is generally unseen but is available to be used for those users who want to attempt to make contact with another registered user in other areas, such as a different country.

Once user 103 has successfully populated fields 14, 15 and 16, he or she is able to select button 17 to proceed to the next step. In this embodiment, and using this application software, it is important for the location to be selected before the next step in the registration process is loaded because the location is an important key to deciphering which user IDs will be available to that user. In this embodiment, the text included in fields 14, 15 and 16 was previously checked via API to the SDB.

User 103 is now able to select at field 18 a valid and available user ID for enabling use of the application software. The availability for the user ID in this embodiment is based largely on two factors, being the specified location and the plan type selected by user 103. In this embodiment, the plan type is colour coded, while in other embodiments, different coding of plan types is used. Further details about the uniqueness of the user ID is provided below.

User 103 is able to enter a mobile telephone number in field 19. The number entered will be added to the user's list of contact points.

At the next step, user 103 must select a plan type and colour in field 20. Four of the plan types include one default colour. Plan 1's colour is Bronze, Plan 2's colour is Silver, Plan 3's colour is Gold and Plan 4's colour is Platinum. In other embodiments different numbers of plan types are provided and different distinguishing elements are used.

If user 103 selects from field 20 to have a free account, then user 103 will have further colour options to select from field 21. For example, in this embodiment a list of colours for a free account are coloured green, blue, black, white, yellow, pink, red, and orange. However, in other embodiments, different or additional colours are included in the list.

The user is then able to select a register button 22 to attempt to register their account. The success of registration is based on specific requirements which are checked via the API to the SDB. Those requirements in this embodiment are as follows: the email address must be unique as a login email address in the SDB; the password must be valid in accordance with the rules used; user 103 must have selected a valid location; and the user ID must be unique for that location based on the selected location and plan colour. For example, if user 103 wished to register a user ID of 'shane' in Australia with a colour of blue, the API will check with the SDB so see whether a user ID of 'shane' in Australia had been registered with the colour blue. If the colour blue has already been registered in that location with that user ID, then user 103 is able to select another colour type that is available. This means the uniqueness of a user ID is based on the location, the text in the user ID and the colour. Accordingly, when a user is searched by another user, the another user will also be able to view the colour which is associated with the first user and thereby allowing him or her to quickly and easily discern if the whole of the user ID is identical.

If a free account was created, then the next step is to progress to a Dial Pad screen in a logged in state with the recently created account. If it was a Paid account that was created, then the next step will progress to the payment screen to allow the relevant payment arrangements to be made. In both cases, the API will then connect with the SDB and create an account.

A contacts list screen 24 is a software feature that, in this embodiment, includes a mixture between user ID contacts and device contacts. A user ID contact is contact details created using the application software by a person having his or her own user ID. This user ID contact is typically available for viewing by other users of the application software. A device contact is a contact that the logged in user has either: imported into the software application from their device contacts list, for example, from a vCard style format; or a contact that the user ID owner has created using the application software and stored internally inside the software application. Preferably such contacts are stored locally inside the application software using a method such as SQLite.

Once stored inside the application software, a user ID contact is able to be identified in a different way from a device contact. In this embodiment, a specific print badge has been applied to the profile image of the user ID contact 25, which allows the user to understand it is a user ID contact. A user ID contact is also stored slightly different to an imported device contact for a user ID contact is updated by the owner of the user ID and then the data contained within the user ID contact is synchronised with any other user who accesses or stores that user ID in his or her application software. All these actions are of course varied to comply with the relevant privacy rules for the different jurisdictions in which the system operates.

Once a device contact 26 is stored inside the application software, it is able to be identified in a different way from a user ID contact. In this embodiment, the device contact is identified in part with an icon similar to that used on a smart phone. The icon is applied to the profile image section allowing the user to understand that it indicates a device contact and not a user ID contact. A device contact is stored in a different way to a user ID contact because, in this embodiment, the user who imported or created the device contact inside the application software is responsible for recording and updating changes to the contact employing a 'single user updates all contacts' like the traditional way of handling contacts as opposed to the user ID contact method where 'many users receive updates from one'.

It is important to note that there are able to be many different types of data associated with contacts 26 and 27. By way example, this includes telephone numbers, profile photos, emails, addresses, fax numbers, birthday dates, names, titles, positions, blurbs, URLs, Social Media IDs, Chat IDs, conversations, call history and other data, or combinations of any two or more of the above. Other types of data could be message history, message content (for example chat history, photos and so forth), email history, email content (for example email conversation history, photos and so forth) and call history which are associated to a particular device contact, user ID contact, telephone number, email address or other similar method of identification. All of the aforementioned data is able to be related to an existing contact or just be standalone data. It is not necessary for a contact to have been created and named on the application software for the data to be manipulated and used in the embodiments of the invention.

When user 103 wishes to hide data (for example, data listed in contacts 26 or 27, or other forms of data) for any particular contact or contacts or non-contact, then a call to action must be taken. One method of doing this, and which is used as an example, is for an expandable menu to appear from the contact's profile photo area. One option for such an expandable menu is an icon 28, which in the embodiment comes in the form of an image of a lock. User 103 is able to select icon 28 to apply rules on that particular contact or contacts and whether it is to remain stored as part of the first data records, or if and when it is to be stored as part of the second data records.

After icon 28 has been selected, user 103 will be prompted by screen 29 with options regarding which data on the respective contact should be hidden from view within the application software. It should be noted that the term 'contact' is able to include any type of contact and/or telephone number and/or email address and/or any data or contact type listed above. The relevant profile photo/avatar 29 is displayed, along with the name, user ID, email address, telephone number and other relevant contact points. In other embodiments, different information is displayed.

If user 103 selects button 30 then the contact profile and record inside the saved contact list of the application software will be hidden for that particular contact, including the email address and phone number. Button 30 provides a toggle option, as do buttons 31, 32 and 33. All these buttons are able to be independently controlled.

If user 103 selects button 31, then all of the SMS message chat conversation with that particular contact will be hidden, including email addresses, telephone numbers etc.

If user 103 selects button 32, all instant messaging on the application software will be hidden for that particular contact, including email addresses, telephone numbers etc. Note, instant messaging should be considered as any type of messaging from one person to another person using any type of digital platform which could include text messages, photo messages, emoticons, video messages, voice messages, email messages, other attachments and so forth.

If user 103 selects button 33 then all call history and message history records on the application software will be hidden for that particular contact, including email address, telephone numbers, etc.

If the user selects button 34 then buttons 30, 31, 32 and 33 will be automatically selected.

Once user 103 has made his or her preferred selections (such as the avatar 29 and the like), button 35 is selected and screen 35a is loaded. Alternatively, the user is able to select the back icon to cancel the selections made.

In this embodiment the user has the ability to alter his or her name, profile photo, user ID and other relevant information which is displayed on the application software at screen 35a. This information will determine how the contact or contacts hidden above will be presented with the online personality for the user making the contact hidden. It should be noted that this step is only relevant if the contact or data being hidden throughout the above steps is another application software user. The application software user hiding the contact is able to choose to keep his or her current logged in details, and those current logged in details are able to be displayed as a default. Alternatively, the user is able to tap on items on this screen to change his or her profile photo, name, user ID or other information for display to the hidden contact. This includes selectively hiding other points of contact, addresses and other details. If on screen 35*a* the My Photo icon is tapped then a process flow is initiated to add a new photo. That photo is stored to be linked only in relation to the hidden contact and is not displayed in other parts of the application software. If the user wishes to change his or her name or user ID, then these changes must be applied and saved only in relation to the link between the user hiding the contact and the hidden contact. That is, the changes should not be displayed in other places. More particularly, the changes should only be applied so as to be perceptible to those contacts whose contact points are stored as second records associated with an authorised second session in which the change was made.

The details which the user has chosen to display to the hidden contact should be displayed in any circumstances possible. This includes, but is not limited to, messaging and making telephone calls to that hidden contact. This means that, when the other user—being the user corresponding with the hidden contact—views the messages or telephone calls (including phone call history) or other interactions from the user making the change, the hidden contact will only see the data that user has chosen to display to that other user at screen 35*a*.

User 103 is then presented with screen 36 where he or she must enter and confirm an identifier which will be needed to unlock and reveal any hidden data—that is, the second records associated with that identifier—in the future.

If user 103 selects icon 37 on screen 36, then by default a dial pad style soft keyboard will appear which allows user 3 to enter a predominantly numerical identifier. The user is able to select icon 38 to toggle between a soft keyboard style and a caps keyboard style, or to select icon 37*a* for image style code options.

By selecting icon 37*a* user 103 is also able to elect to have an image identifier for a second authorised session. This includes, in the embodiment, an identifier created by the ordered selection of a sequence of digital images. Any relevant images are able to be used, and examples include images of animals, popular food items, shapes, and other such items. While any type of image is open to be used for creating the identifier, programmatically care is taken when implementing the associated logic to link each image to predetermined text which is unique for each image. Taking a specific example, user 103 is presented with nine images, of which one is selected as the first image in the sequence. Then user 103 is presented with a further nine images, of which one is selected as the second image in the sequence, and so on. Any number of images is able to be offered to user 103 to choose from. The identifier in other embodiments consists of any number of images at the user's discretion. The application software maps the images to a set ID which will be linked to each relevant image so the identifier will be identifiable for any future attempts to initiate the second authorised session associated with that identifier.

If user 103 selects icon 38 then an alphabetic-style keyboard will appear, allowing user 103 to enter a predominantly alphabetic style identifier. During the defining of the identifier, user 103 is able to also select icon 37 to change the soft keyboard style to dial pad style to include numerical characters in the identifier as well as alphabetical characters. Additionally, user 103 is able to select icon 37*a* to enter an image PIN code as part of that same identifier.

The input provided by user 103 appears in field 39 and is displayed as the desired identifier. By default, the display of the identifier is hidden as user 103 enters the characters or images. However, as an option user 103 is able to reveal the characters or images of the identifier in field 39.

Next, user 103 re-enters the identifier in field 40 to provide confirmation of its characters and/or images. If user 103 enters an existing identifier for another second authorised session then the associated data of the contact which is being the subject of the current process will be assigned to that another second authorised session. That is, when later using phone 101 to access that another second authorised session, user 103 enters the identifier, such as on screen 55, to make discoverable the relevant second data records associated with that second authorised session. Those second data records include any originally included contact details together with the contact that was the subject of the process being discussed at the start of this paragraph.

It is noted that with screen 36 loaded, user 103 is able to review the previous screen 35*a* by selecting the back icon 41.

Once user 103 has successfully entered two identical identifiers in fields 39 and 40, he or she can proceed to the next step by selection button 42. If the two identifiers are not identical then user 103 is notified and not allowed to proceed further until the discrepancy between the two is resolved.

For security purposes user 103 is required in this embodiment to enter his or her account password in field 43 after making the preferred selections on the two previous screens to be able to hide the relevant contact details successfully. This provides additional security against an unauthorised party attempting to hide contacts and/or other data.

In other embodiments different types of verification are adopted. Examples of such different types include a finger print, optical, breath and/or voice analysis, any combination of those. Such verification could be adopted together with a key word that needs to be accompanied with a finger print, breath, optical or voice command. It should also be noted that in the preferred embodiments, when a finger print, breath, optical or voice sample, or similar, is recorded for verification purposes, that an account password is also contemporaneously sought from user 103 to provide further verification. Other verification methods include the requirement to input drawn symbols or taps, either representing a rhythm or taps on particular parts of the screen or designated section. Example voice verifications include humming or singing a tune, expressing a word or sequence of words in a specific way, or creating a vocal rhythm. These different forms of verification are able to be adopted in other parts of the application software, including at screen 55 and 87.

As indicated by the screen area adjacent to reference numeral 44, user 103 will have a multiple attempt to enter the correct password for his or her account. In this specific example user 3 is provided with five attempts. However, in other embodiments a different number of attempts are permitted. If user 103 exhausts all available attempts then that user will be locked out of the ability to assign the contact details to a second authorised session for a set period of time. Preferably, a notification will be sent via email, text or other means to the owner of the user account to provide an alert about the exhausted attempts. The counter to the left of the numeral 44 displays a count of each failed attempt by the user. The counter is reset after a successful user account password is entered successfully.

User 103 is able to apply, update or edit settings on multiple hidden contacts within a certain period of time without having to re-enter the password if button 45 is selected. Moreover, the user has the ability to determine how to treat the entry of the password for dealing with hidden contacts (and other second data records) which is explained further below.

By selecting button 45, user 103 is able to then select, from a list 46 of options, how to treat the requirement of an account password after successful action. The example list provided allows the selection of one of a number of different periods of time in which open access to applying, updating or editing hidden contacts is allowed without the account password having to be re-entered. If the user changes the account password within the selected period of time this does not affect the time selection. That is, preferentially, the time selection is kept and counted without the requirement of user 103 entering the updated user account password. There is also the option for user 103 to subsequently change this setting. In other embodiments, different time periods are available in addition to or instead of those included in list 46.

Once user 103 has made the required selections about the above matters, button 47 is selected. If the account password from field 43 is correct then the relevant selections made during the steps over the previous screens will be applied and the relevant parts of the contact will be stored as second data and will completely hidden from view. That is, the contact will now only become discoverable and accessible via the application software when user 103 re-enters the correct identifier that initiates the second authorised session against which the contact has been associated.

In some embodiments, the or each second authorised session has a unique session ID in addition to the identifier. In these embodiments, the session ID is combined with the actual data being to be hidden, and also combined with the identifier to allow the application software to identify the second data associated with the relevant second authorised session. For example, if the user wishes to hide a voice conversation to a phone with a number 123456 and applies an identifier of 5555 to that conversation, a unique session ID will be created for the identifier 5555 and the content of that hidden data will be all data retained on phone 101 about the conversation to number 123456. If user 103 has a later open conversation with 123456 via the application software and user 103 wishes to hide that conversation to the same second authorised session, the application software identifies the link between the identifier and the telephone number and associates, stores and displays that new hidden data under the unique session ID previously created for the original hidden data. If user 103 has a conversation or interaction with the telephone having the number 123456 inside the application software in an open (non-hidden) first session, then such new data and records will remain unhidden—that is, they will remain saved as first data records—until user 103 decides to save the relevant data records as second data records. If user 103 has a conversation or interaction with 123456 while in a second authorised session then, by default, the data produced by the application software during that session will be automatically assigned to identifier 5555 and stored as second data records, together with any existing second data records.

User 103 is able to select a button 48 when in a second authorised session. By doing so, a list of hidden contacts—that is, contacts that are saved as part of second data records—are accessible via a menu item in the software application. Only contacts and data that have been unlocked during a second authorised session are displayed in this list. If a second authorised session is not current, the second data is not revealed or displayed on this screen. It is therefore possible for this screen to appear empty if phone 101 is in a first authorised session. In the first authorised session, button 48 will not appear for viewing. Similar restrictions apply in other parts of the application software to ensure that the existence of second data is not revealed to user 103 unless a second session is current.

Once user 103 selects button 48 a new screen will load. This new screen contains a list of all groups of contacts that are saved as part of the second data records for the second session that is current. This could include a null result. Accordingly, if there is data or contacts in hidden groups which do exist but which are associated with a different second authorised session, the existence of those hidden groups will not be displayed.

User 103 is able to set a specific name for a group of contacts that area available for grouping in that second authorised session. In an example, four contacts exist in phone 101, being Contact1, Contact2, Contact3 and Contact4. Contact1 and Contact2 are assigned by user 103 to a second authorised session with the identifier 1234*abc*. Assuming this second session did not previously exist, by default the application software will create a hidden group with a default name—for example named "Group"-containing Contact1 and Contact2 and all relevant data pertaining to those contacts that user 3 selected at screen 29 or other similar screens. The details about or associated with both contacts are assigned to the second session having the identifier 1234*abc*. Essentially, a group has been created which stores common data based on the identifier 1234*abc* and has been assigned a default name of "Group". The name is only for convenience of user 103, and the group should not be named after the identifier. The user then applies a different identifier 12345 to Contact3 to assign that contact to a different second authorised session. In that different second authorised session, use is also made of the generic title Group as a default name of a new group associated with identifier 12345. In this latter case, "Group" will contain the relevant hidden details of Contact3. The default name in this embodiment is the same each time, even if an existing group has already been assigned that name, so an unauthorised person will find it more difficult to discern or have knowledge of other existing hidden groups based on the default name of a newly hidden group. The same default name does not necessarily need to be used for each newly hidden group, but the naming system should preferentially avoid a progressive approach such as Group 1, Group 2, Group 3 etc. The name associated with a hidden group need not be unique. However, if uniqueness is preferred, then the default name of a newly created group is able to use random words which do not use a progressive naming system. One way to achieve this is to access a database of words—for example a database having about 10,000 words—each time a new hidden group is created. A randomly selected word from database is assigned as the default name of that hidden group and the application software is also able to be responsive to the already assigned names to existing hidden groups to ensure the newly assigned default name is not identical to the name of any existing hidden groups. If user 3 then decides to add Contact4 as a hidden contact by applying an identifier 1234*abc* to Contact4, by default Contact4 is added to the first group created above due to the identical identifier of 1234*abc*.

The first group was default named "Group". Preferably the identifier is never shown or displayed anywhere to the user. If user 103 wishes to change the identifier then user 103 enters the existing identifier and then enters a new identifier twice to confirm the change. That will result in the new identifier applying to all the second data for that second authorised session.

The name of the group is clearly displayed, for example at reference numeral 50—and default naming systems adopted for each setting of a new non-existing or different identifier.

The user is able to change a default group name at a later stage.

By default, the identifier for a second authorised session should never be displayed on interface 106, and the application software is configured to keep the one or more identifiers private.

The profile icon for a group may be a standard default type icon or user 103 is able to set a photo for the group. The photo is hidden and revealed along with all other parts of the data assigned to the group only when the relevant second authorised session is current.

Under the group name there is provided, as indicated next to reference numeral 51, the number of contacts or pieces of data that are contained within that revealed group.

A button 52 is a 'kill switch'. This button is available to user 3 at all times during any second authorised session. When the kill switch is activated—by selecting button 52, or a predetermined verbal command or swipe—the current second authorised session is terminated and phone 101 returned to the first authorised session. That is, all hidden groups which are currently revealed are automatically hidden immediately and the state of those groups, contacts and data should return to a hidden state which cannot be seen and can only be revealed again when user 103 re-enters the relevant identifier. The groups should not be seen and should not be accessible immediately after the kill switch feature is activated.

There are other methods for the user to initiate a kill switch function which will be noted throughout this document. Some example methods are allowing the user to set default closure of groups based on various actions of the user, for example, if the user closes or minimises the app and also other methods such as the user using specific gestures via movement or voice which will initiate the kill switch function. A record is made within the app to record whether the kill switch was initiated by the user. If the kill switch was initiated by the user then all hidden groups and the contents of the hidden groups have a hidden status applied to them indefinitely until a relevant identifier is entered to reveal the content of that hidden group again. This record should be stored inside the application software. It should be noted that in the event the kill switch is initiated by the user, any groups with a stored attribute of "No" from selection 75 below are automatically given a status of "Yes", ensuring that those groups are not revealed when the application software is closed and then opened.

During the second authorised session a menu icon 53 allows access the menu options for each revealed group. When user 103 selects icon 53 the menu settings for that relevant group are loaded.

The selection by user 103 of an identifier icon 54 which will load a screen 55 that allows the user to enter an identifier to reveal or hide specific groups, data and contacts. On screen 55, user 103 must enter a correct identifier associated with a hidden contact, data or group for the relevant group, data or contacts to appear and become visible and accessible. User 103 also decides what type of soft keyboard or visual option to use when entering the identifier. If user 103 has applied an image identifier, then a pop up appears to allow the user to select the required images. As noted elsewhere, there is able to be multiple different sets of images to in an identifier.

There is a field 57 available for receiving the third input from user 103 to indicate the identifier. This field is similar to field 39. The third input entered into field 57 is then used as a reference to check whether the third input matches an identifier that is able to reveal hidden contacts, groups or other second data.

User 103, in providing the third input, will have up to ten attempts to enter a correct identifier. Each time user 103 provides third input that does not match an identifier, a counter 58 will increase until the maximum limit has been reached. Preferably, each time user 103 enters a non-matching third input, the application software will call the camera function on phone 101 and take a photo with the intent to capture one or more images of the person operating the phone. While preferential use is made of a reverse facing camera on phone 101, other camera angles and devices are also able to be used. Each time an incorrect entry is made entered and a photo taken, the photo is automatically sent to an email address of the owner of the user account. If there is no active internet connection then the relevant photo is stored on phone 101 and also as second data inside the application software. The image is queued ready to be sent to an email automatically when an internet connection is available. The photo or notification may also be sent via text message. If user 103 has given the application software access to the location of phone 101, then the location should also be included in the notification. If user 103 has given the application software access to a microphone device on phone 101, then a recording is also able to be captured and sent via online methods each time an incorrect third entry is made. Preferably these options are able to be toggled on and off by user 103.

Once user 103 has provided the third input he or she selects button 59. If the third input matches an identifier then the relevant group, data or contacts will be revealed on a screen such as screen 49, along with all the relevant data of that contact or group.

The broken line illustrated by reference numeral 60 represents a designated area from the user interface of a group named 'Group 2'. If user 103 presses anywhere inside this area, phone 101 will load a new screen that will allow user 103 to access, view and interact with the revealed contact, data or contacts inside that group and give the relevant data which was hidden for that contact, chat conversation or call history. In this example "Group 2" has already been successfully revealed by the user via the correct entry of the relevant identifier. The revealed group, in this case 'Group 2', is loaded and the relevant revealed details of that group are displayed on a new screen. This screen includes such features such as a dial pad, search functionalities for both internal and external purposes, contacts screen, messaging screen, history screen and more. All interactions performed by user 103 is during a second authorised session and as such, any data generated by any application software, will be saved as second data records. This will include data added, contacts added, data and contacts edited, data subtracted and so forth. Once the second authorised session ends, all that data will not be available for viewing in the first authorised session, and will only become available for discovery once the relevant identifier is successfully re-entered. For example, if, during the second authorised session, user 103 presses in area 60, and then loads a dial pad to place a phone call, the historic details of that phone call will be automatically tied to the relevant group and automatically tied to the current second session and will be hidden when other data of that session is hidden and revealed only when other data of that PIN code is revealed.

When expanding a group during a second authorised session, there is provided a Contacts icon 62 that is able to be selected to provide a list of relevant contacts associated with that group. There is a variety of data that may be stored per contact within the group and such data includes, for example, a profile photo, name, ID, address, statuses, type of contact, contact points (such as email, phone number, mobile number, fax number, URL, chat ID (like TM, Skype, Viber, Facebook, Wechat, Whatsapp etc.), audio file, websites, blurbs, posts, social media links, birthdays, job details, work details, photos other private data, other data and so forth. All of the aforementioned data is stored within the second data records that are associated with that second session.

A profile photo of the revealed contact is able to be displayed at icon 63.

A name (or ID, or both) is able to be displayed in section 64. In some embodiments a location is also displayed.

One or more contact points are displayed in section 65, or at least icons for one or more contact points. User 103 is able to slide or gesture to move the contact points to the left then another two contact points, if available, are revealed. If a user presses on any of the contact point icons then the relevant contact point is activated. For example, if the user presses on a telephone icon then a phone call is placed to that phone number associated with the icon.

Each contact, or conversation, or any type of data stored and associated with the identifier has a settings screen available to it. This embodiment, user 103 is able to long hold or press on a profile photo area to activate a menu option to expand and become visible. One of the options on this menu is a settings icon 66 which, when pressed, loads a settings screen for the second data records for the current second authorised session. Other user interface methods are able to be adopted to achieve the same or a similar result.

A menu screen 67 is provided for a hidden contact or hidden data. On screen 67 user 103 is able to set different options that are applied directly to relevant contact or data which is revealed. For example, at 67a there is an option for user 103 to select and edit which details—such as name, photo, user ID and more—will be displayed to the relevant hidden contact. When this option is selected a screen similar to screen 37a is loaded which displays the earlier selections made by user 103 while also providing the ability for user 103 to edit those options.

There is an option at 68 for user 103 to select/edit which information from the relevant contact or data is revealed.

After actioning 68 a screen should appear which is similar to screens 29 to display the earlier selections user 103 made in relation to what data is displayed for that relevant contact. The ability for the user to edit and save updated selections from that data is provided. The data selected/edited will then be revealed for that relevant contact or data. This includes any type of data that has been transmitted, in this example, for the relevant contact or data, including but not limited to, the contact's profile, the contact's messages (SMS), the contact's messages, call and message history, emails and any other type of transmission which carries displayable data.

There is provided an option for user 103 to assign a new identifier which will override the existing identifier previously assigned to that second authorised session. This process is similar to that described with reference to numerals 36 to 47.

User 103 need not necessarily have to enter the existing identifier for the relevant data or contact as the identifier would have already been successfully entered due to the data or contact being in a revealed state. Preferably, however, user 103 is required to enter the existing PIN code for that contact as an additional security measure. The selection made from list 46 will also be relevant.

There is an option for user 3 to select at 71 whether notifications relating to the relevant hidden contact or data will be displayed to user 103 when a particular action occurs. For example, if user 103 has selected for notifications to be received even when that contact or data is hidden, phone 101 will provide such a notification that some data (for example a message) has been received. Standard notifications of this type include messages and notifications sent over APNS, GCN and other similar services. To give a more distinct example, a hidden contact is able to send a message to user 103. If user 103 has accepted to receive notifications from that hidden contact even when the hidden contact is in a hidden state, then a notification will be sent to phone 101 notifying user 103 that a message has been sent by the relevant hidden contact. If user 103 has not accepted to receive notifications from that hidden contact then no notification will be displayed when a message is sent from that contact. Rather, user 103 will need to manually check for messages from that user by revealing the contact using the relevant identifier for that hidden contact.

There is an option at 72 for user 103 to select whether an email notification relating to the relevant hidden data or contact will be displayed to user 103. For example, if the user has selected yes then each time a piece of data (a message for example) is sent to the user from that relevant contact or data, the user will receive an email notifying them of the data transaction. This is similar to the process described above in relation to messaging. The email is able to be received via the application software or any email the user wishes to record.

There is an option at 73 for user 103 to release a contact or data to an unhidden status. When user 103 selects this option he or she is first prompted with a message confirming that they understand the results of releasing the contact or data. If the user confirms, then all of the data or contact data are released back into the visible section of the application software and become accessible without the need of an identifier. The contact data or data will become unhidden, permanently unless user 103 reapplies an identifier to that contact or data. There is no record of the identifier previously attributed to the data or contacts that are released by the option at 73.

A menu screen 74 is provided for a group of hidden contacts or data. This screen 74 allows user 103 to set different options that are applied directly to all of the relevant contacts or data which is stored in that group by way of the same identifier. That is, changes are able to be applied to all the sub-set of records associated with a given second authorised session.

There is an option at 75 for user 103 to select whether the hidden group and all of the hidden group contents, including all hidden data and contacts within that group, should disappear when the user closes or minimises the software. For example, if user 103 has selected YES for this option, when the user leaves the application software via the home button on a mobile device or via the back button, effectively minimising the application, then the relevant hidden group and all of the hidden contacts and data within that group will automatically revert back to a hidden state. If the software crashes or closes for other similar reasons, the hidden data and contacts all revert back to hidden state the next time the software is opened. If the user is using the application software on a desktop computer, for example, the minimise effect explained in this step is activated if the user minimises the application window on the computer or exits or shuts down the application software on the computer.

There is a specific coded procedure illustrated at 76 which is implemented to ensure that hidden data is not displayed at an incorrect time. Preferably, an attribute is assigned to all relevant hidden groups, contacts and data based on the user's selection at 75. The default setting is always "Yes" for any new group, contact or data being assigned a hidden state unless the user has chosen otherwise. For example, if user 103 creates a new group, that group should always be automatically hidden in the event the user closes or minimises the application software and should remain that way unless the user selects a different setting option relating to when the group and the group's content is hidden and revealed.

If the user has chosen "Yes" at 75 then that selection is recorded and stored within the application software. The next time that application software is maximised or opened after being closed or minimised by the user, a check is performed before any hidden data is displayed. The hidden data with the attribute of "Yes" is not shown until the user manually enters the identifier to reveal that data associated with the identifier.

If the user has chosen "No" at 75 then the relevant hidden groups, contacts and data may be displayed when the software is opened or maximised after being close or minimised by the user.

There are other methods available to ensure the same or similar functions to those referred to above.

If user 103 selects "No" at 75 it implies that the user does not wish to continually enter the identifier to reveal that particular hidden group. Even so, in this embodiment if the user initiates the kill switch (button 52) then all hidden groups with an attribute of "No" will be assigned an attribute of "Yes". There is a further option, in which user 103 is allowed to set a "Permanent No" on a group. If a permanent No is assigned to a group then even the initiation of the kill switch will not terminate the current second authorised session and that hidden group will remain in a revealed state when the software application is next opened.

There is an option at 77 for user 103 to select whether notifications relating to the relevant hidden contact or data associated to the group will be displayed to the user. For example, if the user has selected for notifications to be received for a group, then even when that group's contact/s or data is hidden the user will receive a notification that some data (for example, a message) has been received from that contact. Standard notifications of this type would include APNS, GCN and other similar services. This is similar to the steps described around option 71.

There is an option at 78 for user 103 to select whether an email notification relating to the relevant hidden data or contact within the group will be displayed to the user. For example, if the user has selected YES then each time a piece of data is sent to the user for a contact or data within that group, the user will receive an email notifying them of the data transaction. This is similar to the steps described around option 72.

There is an option at 79 for user 103 to release all contact/s and data from a group back to an unhidden status (state). This is similar to the steps described around option 73.

The user is able to select option 80 to manually hide the relevant group and its contents immediately.

If user 103 has locked the application software with a PIN code (which is described further with reference to the feature labelled with reference numeral 87 below) the user may then also assign one or multiple hidden groups to the unlock PIN code screen. That is, the identifier can be entered via the unlock PIN code screen to progress directly to the chosen second authorised session. Once a group is assigned to the unlock PIN code screen this means that if the relevant PIN code for that group is entered on the unlock PIN code screen the relevant data for that group will automatically be visible once the unlock PIN code screen is unlocked. There are numerous methods in which this is able to be achieved. One is for the relevant identifier for the hidden group, once entered successfully on the unlock PIN code screen, automatically unlocks the app and reveals the relevant data. Another method is for the relevant identifier for the hidden group is entered first and the user is then prompted to enter their standard unlock PIN code to unlock the application software. The application software uses logic to decipher which PIN code or identifier is entered and the relevancy of the entry. A failure system, as explained above, is also applied to this functionality.

The application software has the ability to hide specific data, for example, a conversation, photos, videos, text files, phone records, search records, a contact, or other pieces of data. It is also able to hide specific data within data within a digital conversation. By selecting a button 81, user 103 opens a conversation screen 82. Conversations are able to be viewed via data that was previously hidden and unlocked via an identifier, and data that was permanently revealed and which is not associated with an identifier. For example, a conversation is able to be opened from 24 which is a conversation that is permanently visible in the software application as it has not be assigned or associated with an identifier. A conversation is also able to be opened from the tab icon next to icon 62, from a sub screen of 60 which did have an identifier assigned to it and is in a revealed state. It is possible within this application software to have two conversations with the same person, one part of the conversation is stored and revealed in a permanently revealed state and one part of the conversation is stored in a hidden state with an identifier assigned to it.

Screen 82 is an example of a conversation screen and includes a number of different features, including but not limited to, the ability to send messages consisting of text and see those messages listed after sending, the ability to receive text messages and view those messages after receiving. Other data may also be sent as content of a message, for example, an image, video file, audio file, emoticon, other animated images and pieces of data. Preferably, a conversation screen will also display details about the users, accounts, people who are included in the conversation and display which message relates to which user.

On screen 82, messages will preferably be visually separately displayed from one another. One such message 83 is highlighted by a bounded dashed line. When user 103 interacts with this area the user should be able to access a menu or option for the user to be able to hide a specific message or messages within that open conversation. Preferably, the user will tap or hold on a message item and an option menu appears allowing the user to choose to hide only that specific message using an existing or new identifier. Multiple messages are also able to be hidden in this way. If the user chooses to hide multiple messages then a new user interface appears giving user 103 the ability to highlight and select individual messages (one or more) within that conversation. Once the selection is made, user 103 is able to select a "Next" button and continue with a process such as that described above with reference to numerals 36 to 47. After user 103 has completed that process, those messages disappear from the unhidden or revealed conversation list and are stored as second data records as a hidden conversation list using a unique session ID and the relevant identifier. Other relevant information to the conversation is also able to be stored, for example, the number and identity of other users in the conversation.

Each time the relevant conversation is opened in an unhidden state, the unhidden messages are displayed. Effectively, the message or messages that were hidden via the use of an identifier are displayed only when the relevant identifier is entered. Messages from the same conversation hidden under the same identifier are displayed together.

When data, such as a message or messages, are displayed in a hidden state user 103 has the option to display the hidden messages alone (the default option) or the hidden messages and the permanently revealed messages together. For the latter option, both types of messages will only be displayed when hidden messages have been revealed by the relevant identifier having been provided. Hidden messages are not revealed and displayed on the permanently revealed conversation screen which is accessed from screen 24. If user 103 chooses to display hidden and unhidden messages together in the same screen then colour, highlighting or other visual aids are provided to allow the user to easily differentiate between which messages are hidden and which messages are unhidden. Any messages sent from the hidden conversation screen will be automatically assigned a hidden state. Because of this ability there should be a link created and referenced between the original conversation and the hidden conversation within the application software. Essentially, using the application software the user is able to have a conversation within a conversation. That is, the conversation accessible via screen 24 is able to display certain parts of the conversation which are in a permanently revealed state, but with the same contact is able to have hidden parts of the conversation which have been hidden via application of the identifier and therefore hiding those parts of the conversation do not appear in the permanently revealed place inside the software application. The user should also have the option to release hidden conversation messages back to a permanently revealed state.

User 103 also has the ability at 85 to manually change the date of any message or phone call or other details associated with any hidden contacts that are in a revealed state. The user also has the ability to hide any data of any message or phone call or other details associated with any hidden contacts that are in a revealed state in the permanently revealed section of the application software.

A settings menu 86 is accessible from the conversation screen. The menu 86 contains the same options or similar options to the screen that displays the features referred to by reference numerals 67 to 73.

User 103 also has the ability to lock the app using a PIN code or other type of systems presented in features 37a and 43, for example. If user 103 chooses to lock the app using such a system, the user should also have the ability to unlock the app using the process and system described at 80a. Therefore, if user 103 enters a relevant identifier which has been activated at 80a then, on screen 87, when the application software opens, the relevant data associated with that identifier will automatically be in a revealed state and viewable by user 103.

Figure 5:
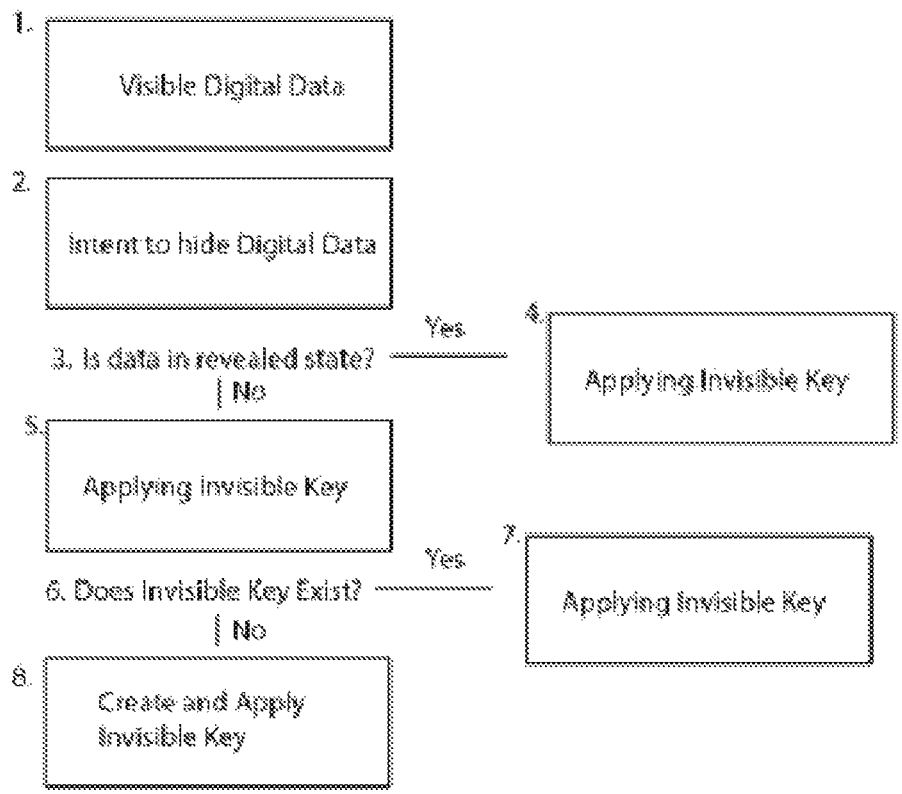
FIG. 5 is a schematic representation of a process used in an embodiment of the invention.

Reference is now made to FIG. 5 where there is illustrated schematically a process used in an embodiment of the invention. At step 1, user 3 selects one or multiple pieces of data that is currently visible to the user by providing input to interface 6. The user could be viewing data that has been revealed from a hidden state (revealed state) or the open or normal state where the data has not been associated with a second authorised session and respective identifier. That is, the process of FIG. 5 is able to be initiated during a first or a second session.

At step 2, after the user has selected the digital data, the user selects a button or option to indicate the desire to hide the selected data by applying an identifier to it.

At step 3, after the user indicates the desire to hide the selected data, the logic of the application software determines whether the data was selected during a first authorised session or a second authorised session. At step 4, if the data selected in step 1 was in a revealed state, then the user is prompted to enter the identifier for the second authorised session.

Once the user has entered their desired identifier, the user selects a button or option or command to execute and hide that data in the second authorised session associated with the identifier.

There will be an existing identifier associated with the data. Accordingly, when the user enters and applies the identifier at step 4, the previous Invisible identifier will be overwritten with the new identifier, and this new identifier applied at step 4 will then be the identifier used to reveal the selected data from step 1 in the future.

The app executes logic, which is not visually displayed to the user, for assessing the identifier entered at step 4. The logic should detect whether the identifier entered at step 4 is an existing identifier or whether it is a new identifier.

If the identifier is an existing identifier then the data selected by the user at step 1 will be associated with the entered identifier and any other data also hidden by that identifier.

The interface 106 will load at step 5 a screen that enables the user 103 to enter an identifier. This screen will appear even if the user has existing data hidden though being associated with other existing identifiers. This ensures that, any person not aware of the existence of the previous application of one or more identifiers to data, is not alerted to that existence. The data should not be automatically hidden with an existing identifier without the user manually entering that existing identifier at step 5.

Once the user has entered the desired identifier, the user selects a button or option or command to execute and hide that data using the entered identifier.

The app executes logic, which is not visually displayed to the user, to asses at step 6 the identifier entered by the user at step 5. The logic detects whether the identifier entered at step 5 is an existing identifier or whether it is a new identifier.

If the identifier entered by the user at step 5 does already exist there is provided no visual or other feedback to the user that the identifier already exists. The data selected at step 1 is then hidden at step 7 using the identifier obtained at step 5. From this point forward, the data is associated with the identifier entered at step 5 and any other data also hidden by that identifier. All the second data records associated with that identifier only enter into a revealed state when the user enters the relevant identifier. There is no list displayed to the user of existing identifiers, and the user will not be alerted by phone 101 to the existence of the identifiers or the associated second data unless the user has successfully revealed data using an existing identifier.

The data selected at step 1 is no longer in a 'normal state' and will change to a 'hidden state'. That is, the selected data, while being originally stored as part of the first data records, is now stored as part of the second data records.

If the identifier entered by the user at step 5 did not already exist there is no visual or other feedback provided to the user that the identifier did not already exist. The data selected at step 1 is then associated with the identifier entered by the user at step 5 and a new second authorised session is defined using the identifier entered at step 5.

This new second authorised session is able to have additional data selected and hidden within it using previous steps described above.

From this point forward, the data from step 1 will be assigned a hidden state (not a normal state) using the identifier entered by the user at step 5 and is only able to be revealed when the user enters the relevant identifier to unlock the hidden data by initiating the relevant second session.

In light of the above it will be appreciated that in an embodiment the invention provides a computing device in the form of smart phone 101 for providing user account 102 through which user 103 is able to operate phone 101. In this embodiment, phone 101 includes:

memory module 104 for storing first data records 105 and second data records 117, wherein records 117 are hidden;
  a user interface 106 for receiving input from user 103; and
  a processor 107 that is responsive to:
  a) interface 106 receiving a first predetermined input from user 103 for: initiating authorised session 108; and allowing user 103 to access account 102 and discover records 105 while maintaining records 117 hidden;
  b) interface 106 receiving a second predetermined input from user 103 during session 108 for controlling interface 106 to seek a third input from user 103 to indicate a respective identifier for one of one or more hidden second authorised sessions 109, wherein the pre-existence of the one or more second authorised sessions 109 is not revealed to user 103; and
  c) the third input corresponding and not corresponding with one of the identifiers for respectively: initiating the respective authorised session 109 in which the user is able to discover at least a subset of records 117; and not revealing to user 103 if any of the one or more sessions 109 exist.

In a further embodiment the invention provides a computing device in the form of smart phone 101 for providing account 102 through which user 103 is able to operate phone 101, wherein phone 101 includes:

memory module 104 for storing at least first data records 105;
user interface 106 for receiving input from user 103; and
processor 107 that is responsive to:
  a) Interface 106 receiving a first predetermined input from user 103 for: initiating authorised session 108; and allowing user 103 to access account 102 and discover records 105; and
  b) Interface 106 receiving a second predetermined input from user 103 during session 108 for controlling interface 106 to seek a third input from user 103 to indicate an identifier for a hidden second authorised session 109, wherein the existence of session 109 is not revealed to user 103 unless the third input corresponds with the identifier for session 109.

Figure 7:
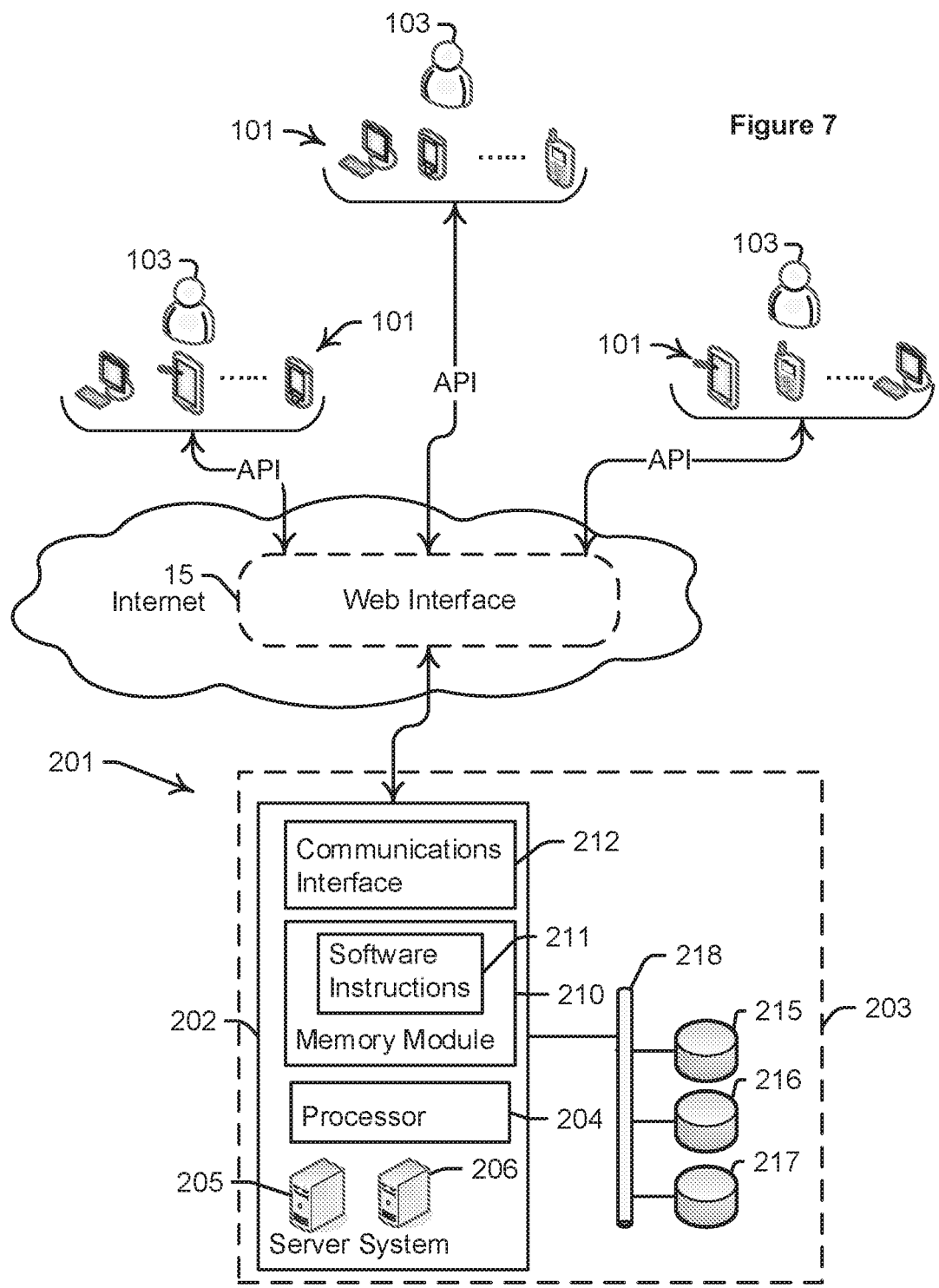
FIG. 7 is a schematic representation of a system according to an embodiment of the invention for interacting with a plurality of the computing devices of FIG. 1.

Although the above embodiments have been described primarily with reference to the computing device of the user, it will be appreciated that the computing device is able to be networked or otherwise connected with a remote computing device to further the functionality and advantages of the invention by making further use of the underlying data structures used in the embodiments. This also allows for multiple computing devices to connect to the centralised computing device to define a system for providing user accounts through which users are able to operate the individual computing devices. Such a system 201 is provided in FIG. 7, where corresponding features are denoted by corresponding reference numerals. In particular, system 201 provides multiple users 103 with respective user accounts through which those users are able to operate computing devices 101. In this embodiment, due to the centralised nature of system 201, users 103 are each able to use more than one computing device to establish separate first sessions. However, in practice a given user need not use difference devices and only use one device. Although only three users 103 are illustrated in FIG. 7 it will be appreciated that system 201 is scalable to accommodate any number of users.

System 201 includes a server system 202 that is located in a secure facility 203. System 202 includes a processor 204 that is provided by a plurality of representative servers 205 and 206 (and other servers not shown). System 202 includes a memory module 210 for storing, amongst other things, software instructions 211 that are executed by system 202 to provide the overall functionality of system 201. System 202 also includes a communications interface 212 for allowing communication with devices 101 and a plurality of representative databases 215, 216 and 217 for storing data records used and/or created by system 202. Use is made of a communications backbone 218 for allowing system 202 to access and/or update the records held in databases 215, 216 and 217.

System 201 includes memory, in the form of database 215, for storing for each user first data records 105 and second data records 117. As described above, data records 117 are hidden records. That is, records 105 and 117 are stored remotely from devices 101 and hence the users are able to access those records using different devices. In some embodiments records 105 and 107 are stored remotely from devices 101 and locally on devices 101, while in other embodiments the records are stored only remotely. In further embodiments, only records 117 are stored remotely from devices 101. In further embodiments, individual users are able to select which of records 105 and 117 are stored remotely.

In this embodiment, the interface for receiving input from the users is defined collectively by the user interfaces of phones 101. Moreover, system 201 includes a system processor that is collectively defined by processor 204 and individual processors 107 that, in combination, are responsive to:
  a) a given interface 106 receiving a first predetermined input from a respective user 103 for: initiating the session 108 of the user account 102 of that user; and allowing that user to access account 102 and discover records 105 for that user while maintaining the second data records 117 for that user hidden; and
  b) the given interface 106 receiving a second predetermined input from the respective user during session 108 for controlling interface 106 to seek a third input from that user to indicate a respective identifier for one of one or more hidden sessions 109 for that user, wherein the existence of a given second authorised session 109 is not revealed to that user (or any other user) unless the third input corresponds to the identifier for that given session 109.

It will be appreciated that each user 103 is only able to access records 105 and 117 that are associated with that user. Accordingly, when a given user initiates session 108, that user is only able to access records 105 for that user and not any other records 105 stored in database 215. Similarly, when a given user initiates session 109, that user is only able to access records 117 for that user and not any other records 117 stored in database 215.

Figure 8:
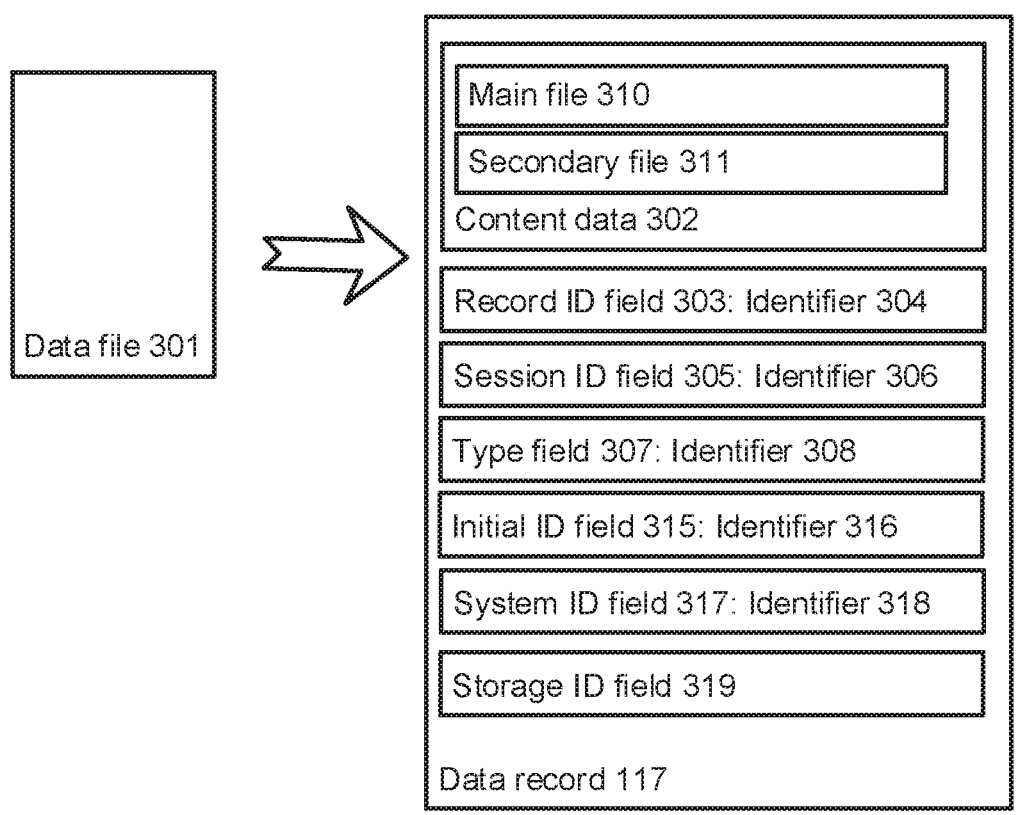
FIG. 8 is a schematic representation of a data structure used in the above embodiments.

Reference is now made to FIG. 8 where there is illustrated schematically a data structure to which hidden data records 117 are conformed. As mentioned above, records 117 are collectively derived from a plurality of types of data files 301 and stored in memory, in the form of database 215, in conformity with the data structure. Each data record 117 is associated with a hidden session 109 for a given user 103 and includes:

Encrypted content data 302 derived from the respective data file 301. The content data is typically represented as text.

A record identification field 303 for containing a first identifier 304 for the data record 117. In this specific embodiment field 303 referred to as "fileId" and identifier 304 is an integer.

A session identification field 305 for containing an identifier 306 for the respective hidden session 109. In this specific embodiment field 305 is referred to as "pincodeId" and is used to sort data 302.

A type field 307 for containing an identifier 308 for the type of the respective data file 301. This allows the type of file to be masked.

In other embodiments different or additional fields are used.

Encrypted content data 302 for each data file 301 includes a main file 310 indicative of the content of file 301 and a secondary file 311 which is a thumbnail file for the respective data file 301. This allows for the relatively rapid download to phone 101 of the thumbnails once a given session 109 is initiated so that these can be decrypted and displayed to the user without having to wait for all the hidden records to be downloaded and decrypted. If a user then selects a given thumbnail then the main file is able to be downloaded and decrypted. The same principle applies if the data is held locally. That is, only the thumbnails relevant to a session 109 need to be initially decrypted, which provides for faster processing and rapid display of the data most relevant to the user. It also ensures that even the type of the original data file remains hidden unless the hidden session is commenced.

In this embodiment, each data record 117 includes an initial session identification field 315 for containing an identifier 316 for the respective hidden session to which the record 117 was initially associated with. Also, each data record 117 includes a system identification field 317 for containing a second identifier 318 for record 117. In this embodiment, identifier 304 is allocated by the respective phones 101 and identifier 318 is allocated by system 201. In addition, record 117 includes a storage identification field 319 for indicating if the respective record 117 is to be stored in database 215.

It will be appreciated that the above data structure allows phones 101 and system 201 to cooperate and allow hidden records 117 to be selectively stored in database 215 instead of or in additional to be stored in local memory module 104 on respective phones 101. This includes selectively synchronising records 117 or otherwise updating the data between the separate stores of data.

The respective authorised second sessions 109 are identified by a unique code to define, in effect, a "secret zone" in which a user is able to view existing hidden records, amend existing hidden records (including making those records no longer hidden) and create new hidden records in that zone. Each instance of such sessions 109 in this embodiment has two key fields, being the identifier 318 and a value field (not shown). Identifier 318 is generated by system 201 to identify and manage that session and to apply the rules for listing, updating, deleting, synchronising and otherwise operating the session. This identifier is held on both system 201 and the relevant phone 101.

The value field for each session 109 is populated with data indicative of the secret key/password that must be provided by user 103 to open/unlock the relevant session 109. This populated data is encrypted (using SHA-256) and stored on phone 101 and/or on system 201. For example: if the user inputs the text "test" as a secret key, it will be encrypted and the value field is populated with:

'9f86d081884c7d659a2feaa0c55ad015a3bf4f1 b2b0b822cd 15d6c15b0f00a08'

Each session 117 is also defined by an autoImport field (not shown) which defines whether the hidden records 117 associated with that session are to be automatically imported from system 201 to the computing device being used by the user to initiate the session.

If when creating a new hidden record 117 a user inputs a new string of text that does not exist as an existing hidden session, then a new hidden session will be created using that sting of text as the value field. Each time the string of text is encrypted as SHA-256 and compared to other existing strings accessed by the computing device.

Each record 117 is a secret image, text or video that is only accessible during an authorised second session 109.

Files 310 and 311 are encrypted based on AES-256 and other keys located on the computing device and system 201. The flow for encrypting file 301 is as follows:

An end key will comprise three parts: SECRET_MEDIA_KEY; a key from system 201; and originalPincode in SHA-256 format; where SECRET_MEDIA_KEY is a hard code string stored on the software.

The key from system 201 is a special key uniquely generated for each user and stored in a secure table.

originalPincode is stored on each instance and converted to SHA-256 format.

File content (image or video) is converted to NSData content (bytes data).

The above end key is then used to encrypt the above NSData content to an encrypted state.

The encrypted NSdata is then saved to a file (with the filename being the fileId). This file is stored on phone 101 or uploaded to system 201 (which in this embodiment is a cloud-based system). The state of record 117 on phone 103 at this stage is just a text file, in a binary state and absent of an extension.

The same flow is applied for all data, including the thumbnails.

Files are only decrypted when a second authorised session 109 is initiated and, even then, only the records 117 that are relevant to that session 109. Moreover, as mentioned above, this is also able to be further segmented into initially decrypting only the thumbnails to provide faster effective assess to the relevant data. In other embodiments the segmentation occurs based upon usage or other such inputs. For example, recently used files are given priority over files that have been dormant. In other embodiments different inputs and heuristics are used.

Decryption takes place in the same kind of flow as the encryption described above, and is generally as follows:
- Load the encrypted NSdata from the file which is on phone 101 or which is retrieved from a remote location (system 201).
- The end key is then used to decrypt the NSdata.
- The NSdata is converted from text back to the state it was before encryption.
- If record 117 is being opened in a temporary state (which is able to be chosen by the user) then the decrypted data (image or video or whatever) will be cleared from the local memory in phone 101 automatically once session 109 is terminated.
- When use is made of system 201 to store records 117, there will be, at the attempted initiation of each session 109, a verification check to ensure the correct secret key has been entered. If that check is successfully passed, the following steps occur:
    - A data list is retried from system 201 and saved to memory module 104 on phone 101.
    - All relevant data records 117 are imported and loaded either from system 201 or locally on phone 101. This will depend for each record 117 based upon the contents of field 319.
    - Automatically load the thumbnails inside phone 101. Alternatively, if the thumbnails are not stored on phone 101, start downloading the encrypted thumbnails from system 201, then decrypt and display the thumbnails to the user.
    - If encrypted files 310 are not stored on phone 101 then:
        i) If user 103 has set the import status to autoImport, then the encrypted files 310 will be automatically downloaded in the background while session 109 is active.
        ii) If the user has not set the autoImport status to ON, then the full encrypted files 310 is only downloaded when user 103 opens a full screen image or initiates the playback of a video file or opens a data file.

In an embodiment, the invention provides a data structure for a plurality of hidden data records 117 that are collectively derived from a plurality of types of data files 301 and stored in memory, preferably locally and remotely. Each record 117 is associated with a hidden session 109 and includes:
  encrypted content data 302 derived from the respective data file 301;
  record identification field 303 for containing first identifier 304 for the data record 117;
  session identification field 305 for containing identifier 306 for the respective session 109; and
  type field 307 for containing identifier 308 for the type of the data file 301 from which record 117 is derived.

The major advantages of the above embodiments include:
- The ability to back-up data more securely as the hidden records are retained in an encrypted form on the local computing device and any back-up device.
- Being able to accommodate not only any data type, but also large amounts of data spread over many different second authorised sessions.
- Allowing selective download of encrypted records to the computing device to increase the speed of operation of the computing device, making the operation less susceptible to bandwidth limitations between the system and the computing device.
- Allowing selective download of files from the system to the computing device.
- Allowing selective decryption of hidden records.
- Allowing selective encryption. That is, a decrypted file only need be encrypted if changed.
- Using the combination of the memory capacity and the computing capacity for the system and the computing devices.
- The user does not have to enter his or her credentials each time that there is a desire to initialise a second authorised session.
- The existence of the second authorised session, and its identifier or other credentials, is not normally visible, even with access to the user account.
- The second authorised session remains hidden and highly inaccessible even if there is a breach of the user account.
- Multiple different second authorised sessions, and second authorised sessions nested in another second authorised session are able to be implemented.
- Rules are able to be formulated to allow the automated saving of desired communication data into the second data records. These rules can be exemplarily based upon one or more characteristics of the party sending the communication data, one or more time factors, one or more properties of the content of the communication data, a file type contained in the communication data, one or more properties of a communication string of which the communication data is a part.
- The user is able to have any first data record later converted to a second data record, and vice versa.
- While using the computing device it may be apparent that it is possible to maintain second records, however it will not be revealed, unless a second authorised session is initiated, that any second records exist. Moreover, even if a first second authorised session is initiated, it will not reveal the existence of otherwise of any other second authorised session.
- The ability to have multiple second authorised sessions and associated identifiers for allowing the initiation of those sessions.
- Hidden data records cannot be deleted without knowing identifier for the second session in which those second records are able to be discovered.
- It is not possible to detect/know/confirm that one or more hidden data record exists or not without knowing the identifier for the relevant second authorised session.
- A user cannot reset an identifier for a second authorised session without knowing the identifier.
- Applicable to a wide range of data records.
- Enables the user, during a second authorised session, to choose a different digital identity for providing better anonymity when communicating with others in blogs, instant messaging conversations, social media, and other such communications.
- When applied to instant messaging, emails, SMS messaging and other electronic communications that form a digital "chain" or "conversation", it is available to the user of the computing device to select one part, a plurality of parts, or the entirety of such a chain to be stored as second records. This also allows a first user to a conventional conversation with a second user and, in parallel, to have one or multiple other hidden conversations with that another user or other users.
- When a first user having a first computing device initiates a conversation with a second user having a second computing device such that the communicated data is saved on the first device as either a first data record or a second data record, the second user has the option to save the communicated data on the second device as either a first data record or a second data record.

It enables the user to have multiple pubic user profiles in the different authorised sessions. This includes the ability to use different avatars, photographs, usernames and other characteristics in the different profiles to further the anonymity of the user.

The second data records are encrypted using the identifier for the second authorised session relating to the relevant second records. This better ensures the hidden status of the second records is not disturbed or changed inadvertently. Accordingly, even if the app logic is corrupted or faulty, the risk of the hidden data being discovered and accessed is low.

The ability to have multiple hidden identifiers and respective second authorised sessions allows the second data records to be assigned to a different second authorised session.

Accommodate a variety of non-alphanumeric identifiers, including, by way of example, shapes, animals, colours, biometric information, voice data, image data, and a combination of two or more of these.

The ability to turn notifications ON or OFF for application software for the communications data that is received and allocated to a second authorised session. For example, typically instant messaging software of email software provides notifications of new and unread messages. The preferred default for the embodiments is for notifications for communications associated with the first and second authorised sessions to be ON and OFF.

The option to have a timeout on an active second authorised session that is less than the timeout for the computing device. That is, if the device is left within user input for a predetermined period, the active or open second authorised session will terminate prior to the computing device moving into the standby mode.

A user is able to start a conversation during a given second authorised session. This allows a default operation of ensuring that all relevant messages and other data generated is stored in second data records associated with the given second access session.

Making use of the first and second data records, and encryption of the second data records, allows replication of those records across multiple synchronised devices for one user. That is, the second data records are able to remain similarly hidden, and discoverable when providing the same correct identifier as third input on the different devices.

When offering instant messaging functionality, there is an ability to maintain a first conversation as a hidden conversation (which is accessed by initiating the associated second authorised session) and a normal or revealed conversation (which is accessed by initiating or returning to the first authorised session.

For instant messaging functionalities, it is possible to have a conversation (or part of a conversation) which is saved as one or a first data record and a second data record, subsequently saved as the other. This change is then able to automatically and securely propagate across any synchronised devices.

The entry of an incorrect identifier for a second session does not provide the user with any indication whether or not there is one, or more, second sessions available to be accessed on the computing device. That is, while the user may know from the existence of the app that it is possible to have a second authorised session, he or she will now be able to ascertain that the computing device does have one, or more, authorised session available to access.

The ability to have multiple second authorised sessions allows greater comfort that even if one second authorised session is accessed without the user's consent, that will only allow the perpetrator to discover those subset of second data records that become unhidden through that breach. The remainder of the second data records will remain hidden.

By allowing all types of data to be held as second data records within a given second authorised session it is possible to maintain much greater secrecy and anonymity. For example, specific contact records are able to be maintained within a given second access session, as well as second records relating to the browsing history for the browsing that occurred while the second session was current. Accordingly, all or at least substantially all data generated by any and all applications during a given second authorised session is able to be maintained in second data records linked to that second session.

CONCLUSIONS AND INTERPRETATION

It will be appreciated that the disclosure above provides various significant a computing device and a method for providing a user account through which a user is able to operate the device.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Reference is made in this specification to "data records". This term is used to describe groupings of data for storage and/or transmission and typically includes content data and format data. That is not to imply that the content data contained within a given data record need be all stored together or transmitted together, simply that the record, however stored or transmitted, provides a functional whole when assembled or accessed.

Computing devices, and in particular personal computing devices, are used to store many different types of data records indicative of the communications between that device and other devices. Those records are indicative of, for example, details of telephone calls, details and content of messages sent via SMS or over other messaging services, details of emails and the content of those email or any other type of digital message being sent, received or communicated from one person to another in a digital format. The computing device executes code to deploy software applications the enable these functions and which maintain databases of data records in response to the ongoing deployment of the application. An example application is Microsoft Outlook®, which includes contact records for containing contact details for the user of the computing device. It will be appreciated that many other applications are available with this function. While for Outlook® contacts records (and the like) the contact details are clearly visibly stored and available, other data records are also retained from the communications. For example, if the user is contacted by a second person by telephone, where that contact is achieved via application software deployed by the computing device, it is usual for a data record for that call to be created (or updated) and stored based on the caller's telephone number. A further example is provided in the circumstance where the user initiates a telephone call via the computing device to a remote party's telephone number. In this case, it would be usual for the relevant software application to create, or update, a data record using the remote party's telephone number as the unique identifier for the record. The same principle applies to messaging, such as SMS, where a data record is referenced using the telephone number alone if a message is received from a sender that is not otherwise identified and not otherwise stored as a contact in the existing data records. All such data records created from or derived from any such communication, or the details of the other party or parties to the communication, are available for use in the embodiments of the invention to form some or all of the first data and/or the second data or to allow for the automated creation, updating and/or storage of the communication data as the first data and/or the second data.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, a smart phone, a switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A system for providing user accounts through which users are able to operate computing devices, wherein the system includes:
    memory for storing for each user first data records and second data records, wherein the second data records are hidden;
    a user interface for receiving input from the users; and
    a system processor that is responsive to:
        a) the user interface receiving a first predetermined input from a given user for: initiating a first authorised session of the user account of that user; and allowing that user to access the user account and discover the first data records for that user while maintaining the second data records hidden; and
        b) the user interface receiving a second predetermined input from the given user during the first authorised session for controlling the user interface to seek a third input from that user to indicate a respective identifier for one of one or more hidden second authorised sessions for that user, wherein the existence of a given second authorised session is not revealed to that user unless the third input corresponds to the identifier for that given session,
    wherein the system makes use of a data structure for the hidden data records, wherein the hidden data records are collectively derived from a plurality of types of data files and are stored in the memory, wherein each of the hidden data records is associated with the second authorized session and includes: encrypted content data derived from a respective type of data file; a record identification field for containing a first identifier for the data record; a session identification field for containing an identifier for the second authorised session; and
    a type field for containing an identifier for the respective type of data file; wherein the encrypted content data for each of the type of data file includes a main file and a secondary file.

2. The system according to claim 1 wherein the memory includes a first memory module on each of the computing devices for selectively storing the first and second data records for the respective users and a second memory module remote from the computing devices for selectively storing the first and second data records for the users.

3. The system according to claim 1 wherein the computing devices include respective device interfaces for collectively defining, at least in part, the user interface.

4. The system according to claim 1 wherein the computing devices include respective device processors for collectively defining, at least in part, the system processor.

5. The system according to claim 1 wherein the main file is indicative of the content of the respective data file and the secondary file is a thumbnail file for the respective data file.

6. The system according to claim 1 wherein each data record includes an initial session identification field for containing an identifier for the respective second authorised session to which the record was initially associated with.

7. The system according to claim 1 wherein each data file is associated with one of a plurality of users and the memory includes: a first memory module on each of the computing devices used by the users for selectively storing the hidden data records associated with that user; and a second memory module of the system that is remote from the computing devices for selectively storing the data records.

8. The system according to claim 7 wherein each data record includes a system identification field for containing a second identifier for the data record.

9. The system according to claim 8 wherein the first identifier is allocated by the respective computing device and the second identifier is allocated by the system.

10. The system according to claim 7 wherein each data record includes a storage identification field for indicating if the respective record file is stored in the second memory module.

11. The system according to claim 1 wherein there are a plurality of hidden sessions and each data record is associated with one such session.

12. A method for providing user accounts through which users are able to operate computing devices, wherein the method includes the steps of:

storing in memory for each user first data records and second data records, wherein the second data records are hidden;

receiving input from the users with a user interface; and providing a system processor that is responsive to:

a) the user interface receiving a first predetermined input from a given user for: initiating a first authorised session of the user account of that user; and allowing that user to access the user account and discover the first data records for that user while maintaining the second data records hidden; and b) the user interface receiving a second predetermined input from the given user during the first authorised session for controlling the user interface to seek a third input from that user to indicate a respective identifier for one of one or more hidden second authorised sessions for that user, wherein the existence of a given second authorised session is not revealed to that user unless the third input corresponds to the identifier for that given session, wherein the system processor makes use of a data structure for the hidden data records, wherein the hidden data records are collectively derived from a plurality of types of data files and are stored in the memory, wherein each of the hidden data records is associated with the second authorized session and includes: encrypted content data derived from a respective data file; a record identification field for containing a first identifier for the hidden data record; a session identification field for containing an identifier for the second authorised session; and a type field for containing an identifier for the respective type of data file; wherein the encrypted content data for each of the type of data file includes a main file and a secondary file.

* * * * *